(12) United States Patent
Oh et al.

(10) Patent No.: US 12,485,484 B2
(45) Date of Patent: Dec. 2, 2025

(54) SEEDLESS SYNTHESIS OF ANISOTROPIC GOLD NANOFLOWERS WITH CELLULAR CONTROL AND DRUG DELIVERY APPLICATIONS

(71) Applicant: The Government of the United States of America, as represented by the Secretary of the Navy, Arlington, VA (US)

(72) Inventors: Eunkeu Oh, Alexandria, VA (US); Kimihiro Susumu, Alexandria, VA (US); Ajmeeta Sangtani, Columbia, MD (US); Katherine Rogers, Silver Spring, MD (US); Okhil K. Nag, Brandywine, MD (US); Kwahun Lee, Evanston, IL (US); Igor Vurgaftman, Severna Park, MD (US); R. Joseph Weiblen, Baltimore, MD (US); Mijin Kim, Springfield, VA (US); James B. Delehanty, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 358 days.

(21) Appl. No.: 18/197,195

(22) Filed: May 15, 2023

(65) Prior Publication Data
US 2023/0373003 A1 Nov. 23, 2023

Related U.S. Application Data

(60) Provisional application No. 63/342,891, filed on May 17, 2022.

(51) Int. Cl.
B22F 9/24 (2006.01)
B22F 1/054 (2022.01)

(52) U.S. Cl.
CPC .............. *B22F 9/24* (2013.01); *B22F 1/0553* (2022.01); *B22F 1/056* (2022.01);
(Continued)

(58) Field of Classification Search
None
See application file for complete search history.

(56) References Cited

U.S. PATENT DOCUMENTS

| | | |
|---|---|---|
| 2019/0187137 A1 | 6/2019 | Kannan et al. |
| 2020/0355696 A1 | 11/2020 | Delehanty et al. |
| 2021/0015944 A1 | 1/2021 | Kannan et al. |

FOREIGN PATENT DOCUMENTS

| | | |
|---|---|---|
| CN | 105903948 A | 8/2016 |
| CN | 105288620 A | 8/2018 |

(Continued)

OTHER PUBLICATIONS

Written Opinion of the International Searching Authority dated Aug. 29, 2023 in PCT/US2023/022214.
(Continued)

*Primary Examiner* — Anthony M Liang
(74) *Attorney, Agent, or Firm* — US Naval Research Laboratory; Fariborz Moazzam

(57) ABSTRACT

A new seedless synthesis of anisotropic nanoscale gold nanoflower (AuNF) particles uses bidentate thiolate ligands to protect the nanoparticle surface and a combination of reagents (for example, ligand, ascorbic acid, and hydroxide) to synthesis AuNF with controlled size and anisotropic properties. Compared to prior art gold nanospheres, AuNF produced approximately a 15-fold improvement in a drug delivery assay.

5 Claims, 22 Drawing Sheets
(22 of 22 Drawing Sheet(s) Filed in Color)

(52) U.S. Cl.
CPC ... *B22F 2009/245* (2013.01); *B22F 2301/255* (2013.01); *B22F 2304/054* (2013.01); *B22F 2304/056* (2013.01); *B22F 2304/058* (2013.01); *B22F 2998/10* (2013.01)

(56) References Cited

FOREIGN PATENT DOCUMENTS

| EP | 3037195 A1 | 6/2016 |
|----|------------|--------|
| EP | 3587009 A1 | 1/2020 |

OTHER PUBLICATIONS

International Search Report dated Aug. 29, 2023 in PCT/US2023/022214.

Oh, E.; Delehanty, J. B.; Field, L. D.; Makinen, A. J.; Goswami, R.; Huston, A. L.; Medintz, I. L., Synthesis and Characterization of PEGylated Luminescent Gold Nanoclusters Doped with Silver and Other Metals. Chem Mater 2016, 28 (23), 8676-8688.

Xiong et al., ACS Nano 2014, 8, 6, 6288-6296 Publication Date:May 28, 2014 https://doi.org/10.1021/nn5017742.

Chandra et al., Chem. Mater. 2016, 28, 6763-6769 http://dx.doi.org/10.1021/acs.chemmater.6b03242.

Xie, J. P.; Lee, J. Y.; Wang, D. I. C., Seedless, surfactantless, high-yield synthesis of branched gold nanocrystals in HEPES buffer solution. Chem Mater 2007, 19 (11), 2823-2830 https://doi.org/10.1021/cm0700100.

Nag, O. K.; Muroski, M. E.; Hastman, D. A.; Almeida, B.; Medintz, I. L.; Huston, A. L.; Delehanty, J. B., Nanoparticle-Mediated Visualization and Control of Cellular Membrane Potential: Strategies, Progress, and Remaining Issues. ACS Nano 2020, 14, 2659-2677. https://doi.org/10.1021/acsnano.9b10163.

Carvalho-de-Souza, João L.; Treger, Jeremy S.; Dang, B.; Kent, Stephen B. H.; Pepperberg, David R.; Bezanilla, F., Photosensitivity of Neurons Enabled by Cell-Targeted Gold Nanoparticles. Neuron 2015, 86, 207-217 https://doi.org/10.1016/j.neuron.2015.02.033.

Carvalho-de-Souza, J. L.; Nag, O. K.; Oh, E.; Huston, A. L.; Vurgaftman, I.; Pepperberg, D. R.; Bezanilla, F.; Delehanty, J. B., Cholesterol Functionalization of Gold Nanoparticles Enhances Photoactivation of Neural Activity. ACS Chem. Neurosci. 2019, 10, 1478-1487 https://doi.org/10.1021/acschemneuro.8b00486.

Oh, E.; Susumu, K.; Makinen, A. J.; Deschamps, J. R.; Huston, A. L.; Medintz, I. L., Colloidal Stability of Gold Nanoparticles Coated with Multithiol-Poly(ethylene glycol) Ligands: Importance of Structural Constraints of the Sulfur Anchoring Groups. J Phys Chem C 2013, 117 (37), 18947-18956 DOI: 10.1021/jp405265u.

Angelomé et al., Seedless Synthesis of Single Crystalline Au Nanoparticles with Unusual Shapes and Tunable LSPR in the near-IR. Chemistry of Materials 2012 24 (7), 1393-1399 DOI: 10.1021/cm3004479.

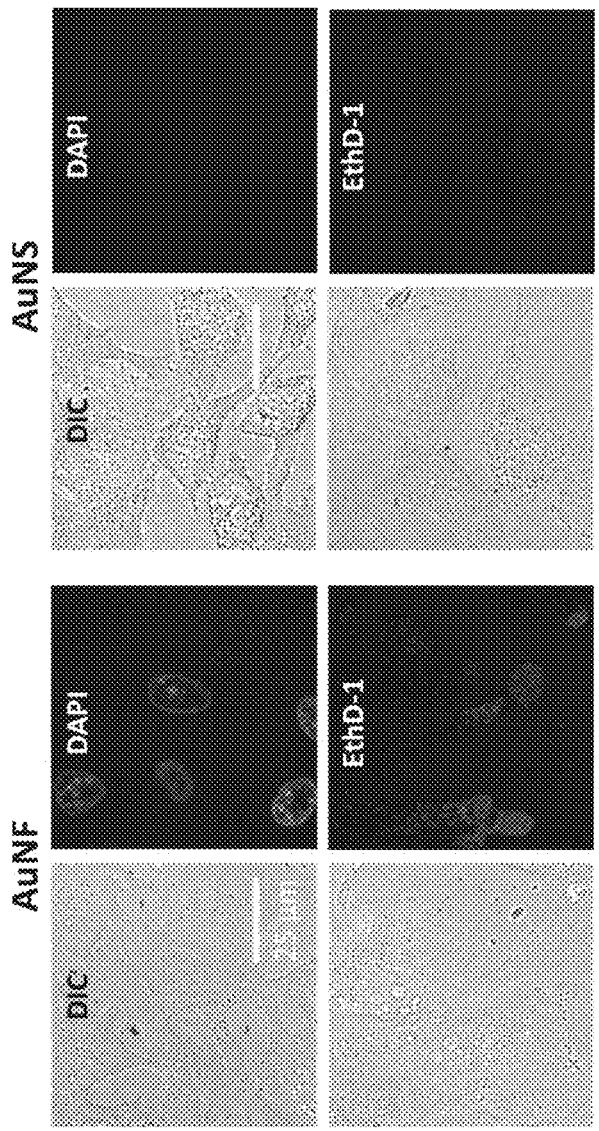
FIG. 5A
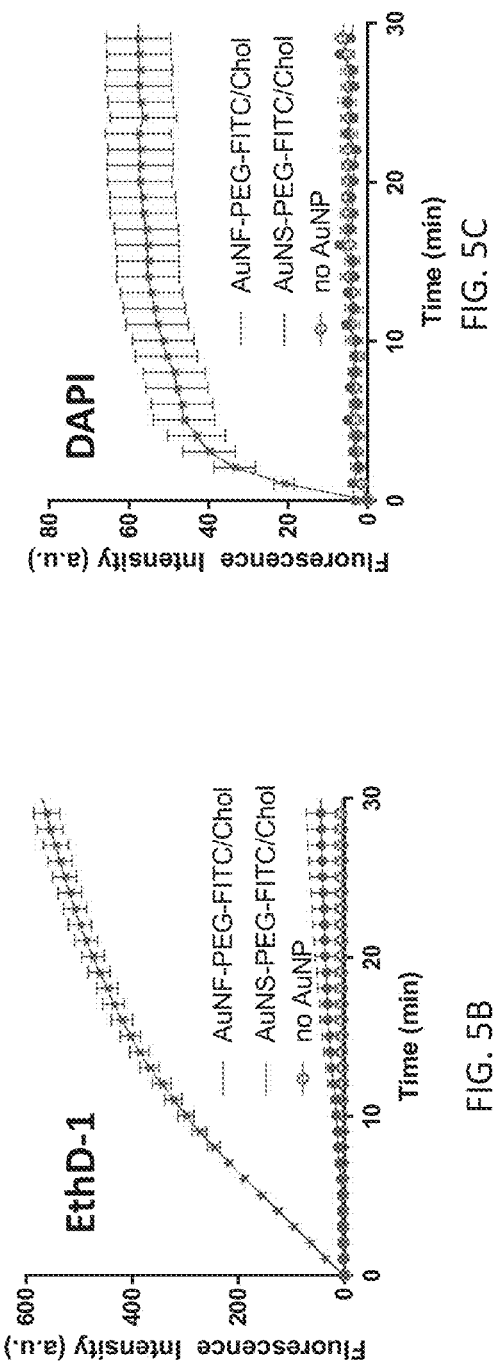
FIG. 5B
FIG. 5C

| Sample | Au (mM) | Ligand (mM) | OH (mM) | Ligand/Au | Size | std | Peak | FWHM | Other |
|---|---|---|---|---|---|---|---|---|---|
| TA200OH100 | 0.4 | 0.40 | 4 | 1.00 | 13.3 | 8.9 | 719 | 196 | Many Nuclei, Low Yield |
| TA150OH100 | 0.4 | 0.30 | 4 | 0.75 | 13.7 | 13.3 | 686 | 185 | Many Nuclei, Low Yield |
| TA100OH100 | 0.4 | 0.20 | 4 | 0.50 | 19.5 | 2.8 | 645 | 170 | High yield |
| TA75OH100 | 0.4 | 0.15 | 4 | 0.38 | 24.8 | 3.4 | 614 | 135 | High yield |
| TA50OH100 | 0.4 | 0.10 | 4 | 0.25 | 38.9 | 3.1 | 554 | 112 | High yield |
| TA100OH75 | 0.4 | 0.20 | 3 | 0.50 | 67.2 | 9.4 | 574 | 161 | High yield |
| TA100OH50 | 0.4 | 0.20 | 2 | 0.50 | 106 | 11 | 578 | 155 | High yield |
| TA50OH50 | 0.4 | 0.10 | 2 | 0.25 | 175 | 14 | 737 | 240 | High yield |
| TA25OH0 | 0.4 | 0.05 | 0 | 0.13 | 379 | 35 | 596 | 300+ | Small pod |
| TA200OH3 | 0.4 | 0.40 | 0.1 | 1.00 | 269 | 41 | 668 | 172 | Long pod, High yield |
| TAA100OH100 | 0.4 | 0.20 | 4 | 0.50 | 37.4 | 7.0 | 570 | 112 | Long pod, High yield |
| TAA50OH100 | 0.4 | 0.10 | 4 | 0.25 | 48.2 | 4.1 | 546 | 107 | Low yield |
| TAA100OH0 | 0.4 | 0.20 | 0 | 0.50 | 504 | 71 | 630 | 158 | High yield |
| TANTA100OH100 | 0.4 | 0.20 | 4 | 0.50 | 21.6 | 3.1 | 621 | 133 | High yield |
| TANTA50OH3 | 0.4 | 0.10 | 0.1 | 0.25 | 156 | 18 | 629 | 242 | High yield |
| TP6C100OH100 | 0.4 | 0.20 | 4 | 0.50 | 22.7 | 3.9 | 613 | 133 | High yield |
| TP6C100OH50 | 0.4 | 0.20 | 2 | 0.50 | 51.0 | 6.4 | 679 | 227 | Flat pod |
| TP6C10OH50 | 0.4 | 0.02 | 2 | 0.05 | 302 | 62 | 611 | 240 | Flat pod, Low yield |
| TP6C100OH25 | 0.4 | 0.20 | 1 | 0.50 | 143 | 35 | 634 | 189 | Flat pod |
| TP6N100OH100 | 0.4 | 0.20 | 4 | 0.50 | 29.8 | 3.5 | 670 | 185 | Long pod |
| TP6N100OH25 | 0.4 | 0.20 | 1 | 0.50 | 192.2 | 31.3 | 634 | 184 | Flat pod, Low yield |
| TP6N50OH100 | 0.4 | 0.10 | 2 | 0.25 | 56.4 | 6.4 | 628 | 181 | Flat pod |

FIG. 7

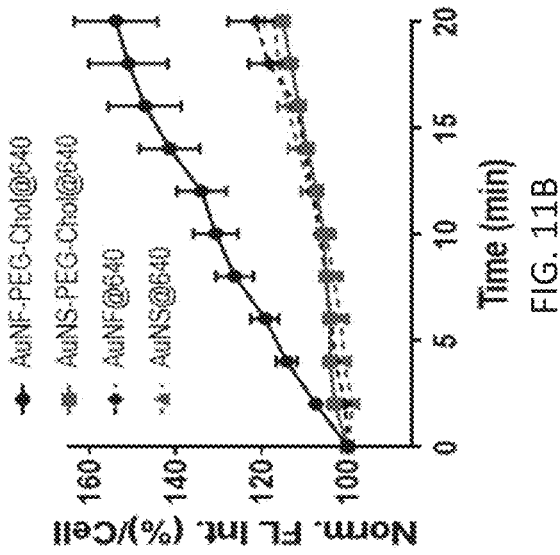
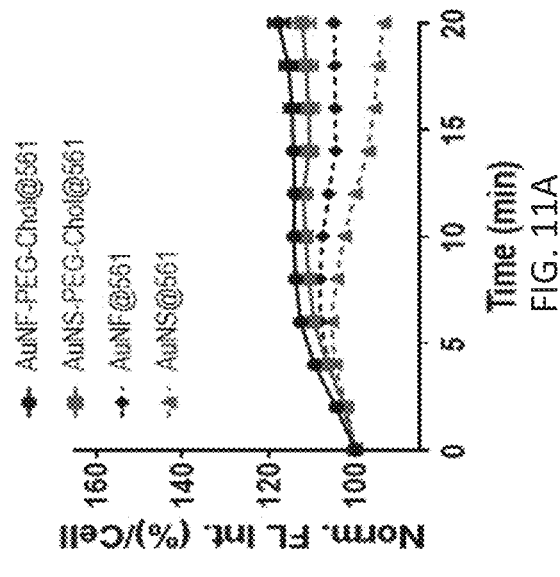
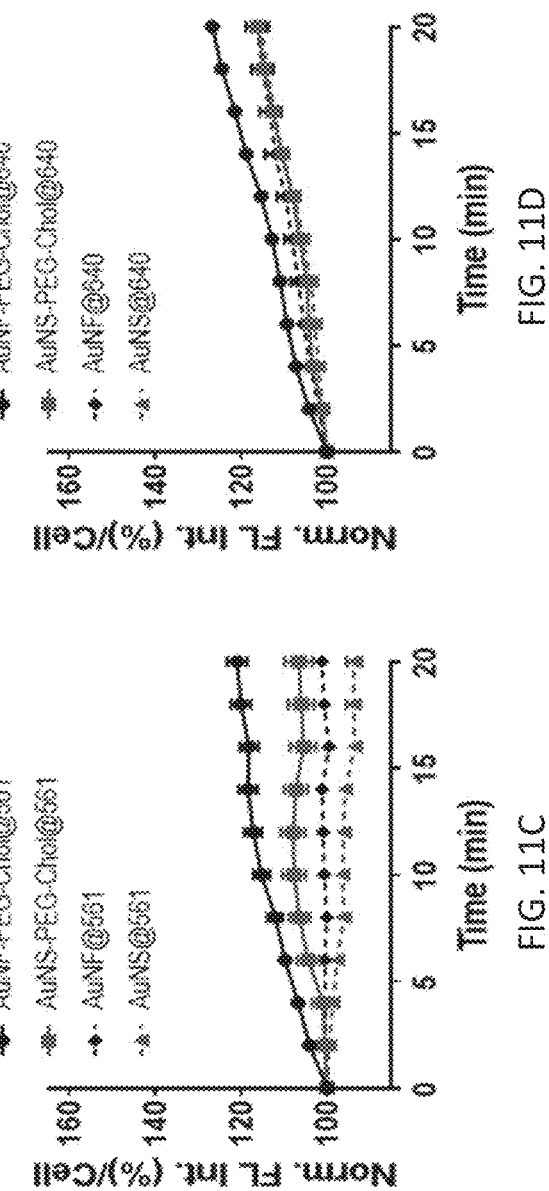
FIG. 11A, FIG. 11B, FIG. 11C, FIG. 11D

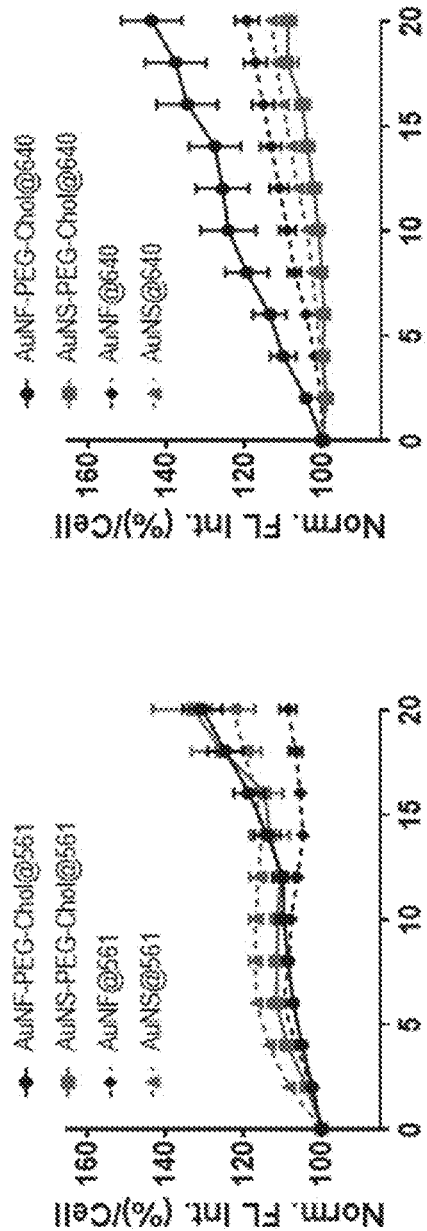
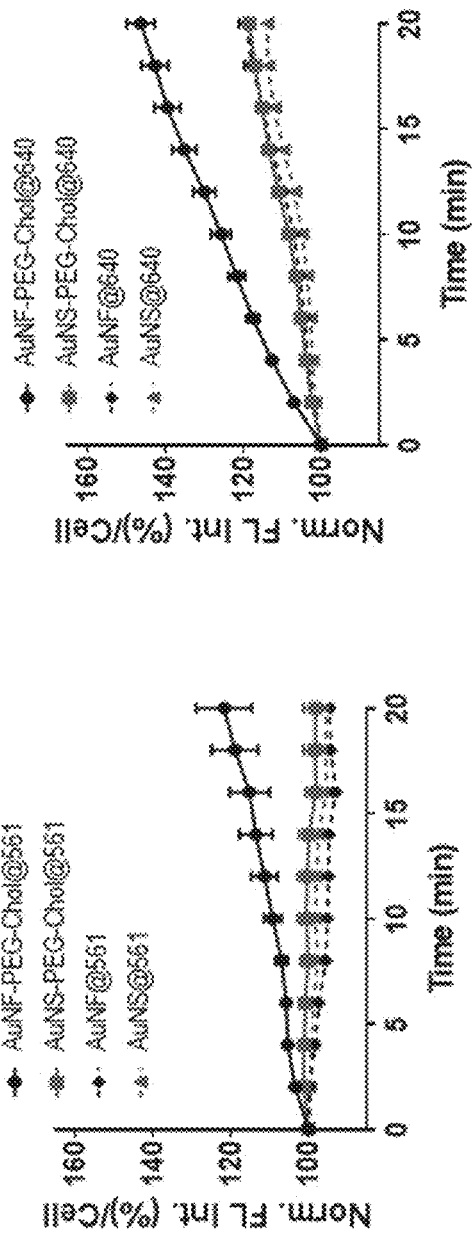
FIG. 11E
FIG. 11F
FIG. 11G
FIG. 11H

SEEDLESS SYNTHESIS OF ANISOTROPIC GOLD NANOFLOWERS WITH CELLULAR CONTROL AND DRUG DELIVERY APPLICATIONS

CROSS-REFERENCE TO RELATED APPLICATIONS

This application claims the benefit of U.S. Provisional Patent Application No. 63/342,891 filed on May 17, 2022, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210684.

BACKGROUND

Metal nanoparticles (NPs) have shape-dependent physical, chemical, and optical properties suitable for various applications in diagnostics and therapeutics [see refs. 1-4]. In particular, these nanoparticles efficiently absorb light energy and convert to heat via surface plasmon resonance (SPR). This photothermal effect has benefit cancer treatments by (1) selective heating and killing of malignant cells in a minimally invasive manner (hyperthermia); and (2) generation of cellular membrane pores for enhanced penetration of drugs into the biological tissues. Further, localized control over neuronal cell activity has also been demonstrated. The photothermal effect can be tuned by the composition, size, and shape of NP cores as well as surface ligands because these features affect absorption cross section, the strength of photon absorption, and absorption-to-scattering ratio. Unlike spherical gold nanoparticles, termed gold nanospheres (AuNS) that can only absorb a short wavelength of visible light, anisotropic gold nanoparticles (which include nanorods, nanocages, and nanoprisms) have a large extinction cross section at a long-wavelength of light (>700 nm) that can penetrate biological tissue with a lower phototoxicity.

Synthesis of anisotropic AuNPs, however, has required multiple steps and cytotoxic surfactant for control over the growth direction [see ref 5.] A few examples regarding seedless synthesis of anisotropic AuNPs, such as gold nanostars, have been reported [see refs. 6-7], yet these NPs tend to gradually transform to spherical shapes within a month. Such a poor long-term stability limits their use of unique optical and physical properties as well as limits their size control, which in turn limits the optical properties. Although surface modifications through ligand exchange can improve the morphological and colloidal stability of NPs, such extra steps can be undesirable. Further, remnant surfactants, such as cetrimonium bromide (CTAB), commonly used for anisotropic AuNPs, after the surface modification may cause cytotoxicity or may impair desired functionalization and further modification with target molecules for biological applications (e.g., peptide conjugation or DNA conjugation).

A need exists for seedless synthesis of anisotropic NPs that have long-term stability, tunable localized surface plasmon resonance (LSPR), and potentials for bioconjugations without ligand exchange for use in applications such as biosensors and bioimaging.

BRIEF SUMMARY

Described herein is the synthesis of seedless anisotropic nanoscale gold nanoflower (AuNF) particles using bidentate thiolate ligands to protect the nanoparticle surface and a combination of reagents (for example, ligand, ascorbic acid, and hydroxide) to synthesis AuNF with controlled size and anisotropic properties such as shape or aspect ratio. Compared to prior art gold nanospheres, AuNF produced approximately a 15-fold improvement in a drug delivery assay.

In one embodiment, a method of synthesizing anisotropic gold nanoparticles includes providing aurate ions, a ligand comprising thioctic acid, a weak reducing agent, and hydroxide and allowing them to react in an aqueous phase, thereby obtaining anisotropic gold nanoparticles a range of 15-500 nm in diameter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B provide TEM images and UV-Vis absorption spectra of AuNF with ligand-to-gold ratio ($R_{ligand}$) at (A) 0.5 and (B) at 0.25 ([$HAuCl_4$]=0.4 mM). FIGS. 1C and 1D provide (C) TEM images and (D) UV-vis spectroscopy of AuNF with various types of ligands. (TA: Thioticacid, TA-NH2: Thioticacid amine, TA-NTA: Thioctiacid with NTA, TA-PEG-COOH: Thioctiacid with PEG-COOH, TA-PEG-NH2: Thioctiacid with PEG-amine). Insets are the FFT analysis of TEM lattice spacing and their corresponding crystal plane.

FIG. 2C illustrates a schematic diagram of growth AuNF tuned by ligand ratio and amount of [OH⁻] during seedless one-pot synthesis along with photographic images to show the corresponding color changes. FIG. 2D illustrates AuNF with various types of ligands showing larger sizes with lower NaOH concentrations.

FIG. 3C schematically compares model geometry of AuNS and AuNF with the same nominal $R_0$. For the AuNS, the NP radius is the same as the nominal radius. For the AuNF, the nominal $R_0$ is comprised of the radius of the base sphere, $R_{BS}$, plus the length of the half-ellipsoidal protrusion semi-major axis, $L_{HE}$.

FIG. 4B presents UV-Vis absorption spectra of AuNF—PEG-FITC/Chol and AuNS—PEG-FITC/Chol. Absorbance of NPs at 640-nm is marked with a red bar. FIG. 4C is a schematic of the use of AuNF—PEG-FITC/Chol in light-mediated cell penetration to deliver highly charged drugs (DAPI and EthD-1) into the cells. FIG. 4D provides the estimated photothermal heat of AuNPs excited by 640 nm laser with different power density, plotted with increase of the distance from the surface of AuNPs. The box indicates the position of cell membrane.

FIGS. 5A-5C show the intracellular delivery of EthD-1 and DAPI via photothermal effect of AuNP—PEG-FITC/Chol. FIG. 5A presents representative DIC and confocal fluorescence images of HeLa cells after 30-min of 640-nm laser irradiation (one-minute interval) in the presence of AuNF—PEG-FITC/Chol (left) and AuNS—PEG-FITC/Chol (right). Scale bars=25 µm. The signal intensities of EthD-1 (FIG. 5B) and DAPI (FIG. 5C) in the presence of AuNF—PEG-FITC/Chol (red), AuNS—PEG-FITC/Chol (purple), and in the absence of AuNP (green) were plotted as a function of time. The signal intensities were obtained from individual cells (N=40-50).

FIG. 7 contains a table showing the properties of various nanoparticles and the conditions under which they were produced.

In FIG. 9A cells were labeled with AuNS NPs while in FIG. 9B cells were labeled with AuNF NPs. (C) Cells were labeled with AuNS—PEG-Chol/FITC NPs. In FIG. 9D cells were labeled with AuNF—PEG-Chol/FITC NPs.

FIG. 10A show cells labeled with AuNF-Chol excited by a 561 nm laser. FIG. 10B shows cells labeled with AuNF-Chol excited by a 640 nm laser. FIG. 10C shows cells labeled with AuNS-Chol excited by a 561 nm laser. FIG. 10D shows cells labeled with AuNS-Chol excited by a 640 nm laser.

FIGS. 11A-11H provide data on depolarization of PC-12 cells. The cells were labeled with 1 nM of AuNPs and excited using a 561 nm or a 640 nm laser every 2 minutes at different power densities (FIGS. 11A-11D). The cells were visualized every 2 minutes for 20 minutes, and cell membrane depolarization was tracked using the potentiometric DiSBAC$_2$(3). Fluorescence intensity per cell was quantified and reported as a percentage normalized to any given cell's fluorescence intensity at 0 minutes time; the initial cell fluoresce was labeled as 100% fluorescence intensity. This allowed for clear interpretation of the change in fluorescence of each individual cell due to laser stimuli over time as compared to the cell's initial fluorescence. The data was then normalized against control data describing the fluorescence intensity change of PC-12 cells unlabeled with AuNPs while laser-excited in the same conditions as the experimental groups. Overall, there is a trend of cells labeled with AuNF—PEG-Chol displaying the highest rates of depolarization over time. In FIG. 11A cells were excited with a 561 nm laser at $2.5 \times 10^4$ W/cm$^2$. In FIG. 11B cells were excited with a 640 nm laser at $2.5 \times 10^4$ W/cm$^2$. In FIG. 11C cells were excited with a 561 nm laser at $6.3 \times 10^3$ W/cm$^2$. In FIG. 11D cells were excited with a 640 nm laser at $6.3 \times 10^3$ W/cm$^2$. For the data in FIGS. 12E-12H, PC-12 cells were labeled with AuNPs at different concentrations such that each group of AuNPs shared the same optical density at 561 nm (OD=0.52±0.01). The AuNP-labeled cells were subsequently excited using a 561 nm or 640 nm laser, cell depolarization was tracked and quantified. In FIG. 11E cells were excited with a 561 nm laser at $2.5 \times 10^4$ W/cm$^2$. In FIG. 11F cells were excited with a 640 nm laser at $2.5 \times 10^4$ W/cm$^2$. In FIG. 11G cells were excited with a 561 nm laser at $6.3 \times 10^3$ W/cm$^2$. In FIG. 11H cells were excited with a 640 nm laser at $6.3 \times 10^3$ W/cm$^2$.

As seen in FIG. 12A, the cellular viability of HeLa cells labeled with AuNF—PEG-Chol (irradiated with high laser power: $6.1 \times 10^5$ W/cm$^2$) was determined by cellular proliferation assay. (B, C) PC-12 cellular viability under AuNP-influenced membrane depolarization (with low laser power). Cells were labeled with 1 nM of AuNPs and cellular cytotoxicity was determined using a live (calcein) and dead (EthD-1) cell stain. They were subsequently subjected to laser excitement every 2 minutes for 20 minutes. Snapshots were taken at 0 minutes and at 20 minutes and live and dead cells were counted. Viability is expressed as the amount of living cells as a percentage of total cells present (additive of living and dead-labeled cells). Neither the AuNP-labeling procedure nor the laser excitation caused and impact to cellular viability. FIG. 12B provides data on cellular viability of PC-12 cells excited by a 561 nm laser at $2.5 \times 10^4$ W/cm$^2$ while FIG. 12C provides data on cellular viability of PC-12 cells excited by a 640 nm laser at $2.5 \times 10^4$ W/cm$^2$. Two-way ANOVA analysis demonstrated no statistical differences between each of the different groups at T0 or T20.

DETAILED DESCRIPTION

Definitions

Figure 1:
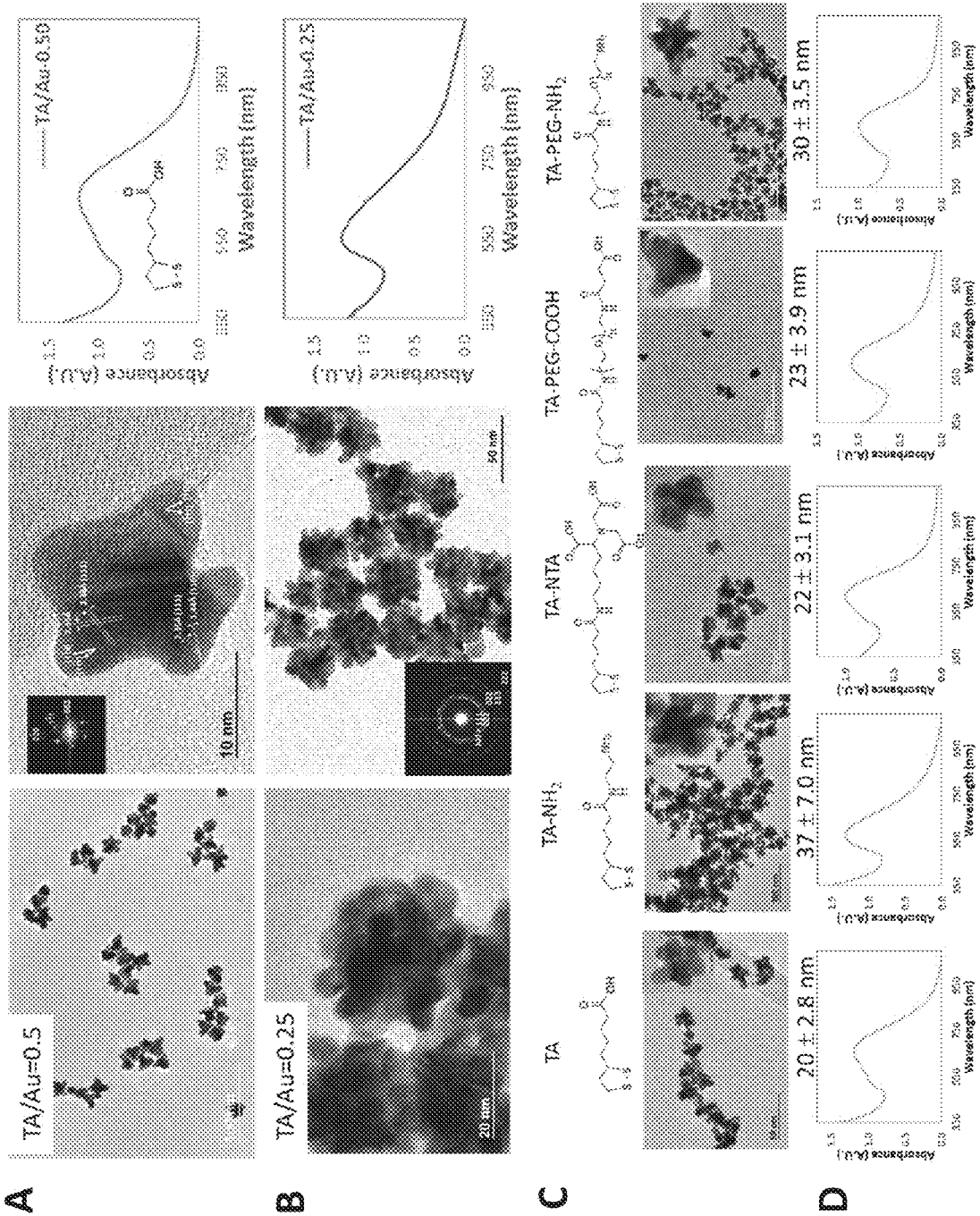
FIGS. 1A-1D show the effect of ligands on the seedless synthesis of AuNF, in particular the role of ligand-to-Au ratios and ligand structures.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

The terms "semiconductor nanocrystal," "quantum dot," and "QD" are used interchangeably herein and refer to an inorganic crystallite of about 1 nm or more and about 1000 nm or less in diameter or any integer or fraction of an integer therebetween, preferably at least about 2 nm and about 50 nm or less in diameter or any integer or fraction of an integer therebetween, more preferably at least about 2 nm and about 20 nm or less in diameter (for example about 2, 3, 4, 5, 6, 7, 8, 9, 10, 11, 12, 13, 14, 15, 16, 17, 18, 19, or 20 nm). QDs are characterized by their relatively uniform nanometer size. A QD is capable of emitting electromagnetic radiation upon excitation (the QD is luminescent) and includes a "core" of one or more first semiconductor materials, with the core optionally surrounded by a "shell" of a second semiconductor material.

The term "nanoparticle" or "NP" as used herein includes the above-mentioned QDs in addition to other nano-scale and smaller particles such as metallic nanoparticles (e.g., nanoparticles comprising Ag, Au, Cu, Pd, Pt, and combinations thereof), carbon nanotubes, proteins, polymers, dendrimers, viruses, and drugs. A nanoparticle has a size of less than about 1 micron, optionally less than about 900, 800, 700, 600, 500, 400, 300, 200, 100, 80, 60, 50, 40, 30, 20, 10, 9, 8, 7, 6, 5, 4, 3, 2, or 1 nanometers. A nanoparticle may have various shapes such as a rod, a tube, a sphere, and the like. Nanoparticles may be made from various materials including metals, carbon (such as carbon nanotubes), polymers, and combinations thereof.

The term "anisotropic nanoparticle" refers to a nanoparticle with a non-spherical shape, including, for example, nanorods, nanocages, nanoprisms, nanoflowers, nanostars, and the like.

The term "seedless" refers to a process that does not involve the use of a pre-formed nanocrystalline nucleation site comprising the same material as the product.

Overview

A new "seedless" synthesis of anisotropic nanoscale gold nanoflower (AuNF) particles uses bidentate thiolate ligands to protect the nanoparticle surface and a combination of reagents (for example, ligand, ascorbic acid, and hydroxide) to synthesis AuNF with controlled size and anisotropic properties such as shape or aspect ratio. As demonstrated herein, AuNFs allow for the controlled delivery of drug cargos across the plasma membrane and the modulation of cellular membrane potential in living mammalian cells.

AuNFs possess unique optical and photothermal properties compared to their gold nanosphere (AuNS) nanoparticle counterparts. Specifically, AuNS has single absorption peak (surface plasmon resonance band) but AuNF has non-symmetric absorption features (with combination of multiple absorption bands) due to their anisotropic shape and more efficiently absorb incident photons. This results in much higher absorption for AuNF at longer wavelengths in the visible and near infrared wavelength region of the spectrum (~700-1000 nm). For example, for 20 nm sized particles exposed to 640 nm light, AuNF has a ten-fold greater absorption compared to AuNS. This difference between the nanoparticles formats would increase at increasing wavelength. Such long-wavelength absorption makes AuNFs ideal for use in living cells and tissues as this "tissue transparency window" is where water and proteins have minimal absorption, allowing for maximal penetration of light.

In nanoparticle synthesis, choice of ligands can affect (1) the final size and shape of as-synthesized NPs; (2) the stability and function of nanoparticles; and (3) post-synthetic modifications of NPs for various applications. Most studies have used citrate to synthesize AuNPs and replace citrates with thiol ligands to improve the stability and the functionality. Some including the present inventors have demonstrated that thioctic acid (TA)-based bidentate ligands as versatile ligands that can synthesize a wide compositions and size ranges (2 nm-130 nm) of spherical NPs [see refs. 8-12]. These ligands also allow readily tunable surface properties of NPs. With the optimal density and structure of these ligands, NPs showed excellent colloidal stability: despite high concentrations of ions (2 M NaCl and pH 2-13) or aggregation-causing dithiothreitol (DTT), NPs did not show optical and morphological transformation for several months [see ref 13].

Described herein is an isotropic form AuNP referred to as AuNFs (gold nanoflowers) that are formed with bidentated thiolate ligands. This is believed to be the first report of direct synthesis of AuNF with bidentate thiolate or single thiolate ligands. This uses a 'seedless' synthesis techniques that is not dependent on the initial formation and subsequent growth of a starter template AuNP seed (such is the current state of the art for AuNS synthesis and anisotropic AuNPs). The synthesis process that can be finely controlled to yield AuNFs of defined shape and size (over the range of 15-600 nm diameter) by combination of reagents comprising bidentated thiolate ligands, weak reducing agent (ascorbic acid), and hydroxide. The resulting AuNF possess high stability and functionality favorable for further conjugation with various biomolecules arising from the strong interaction between bidentate thiol and gold and various choice of terminal groups. Moreover, the AuNFs exhibit significant red-shifted absorbance into the NIR absorbance window (750-1500 nm) with a corresponding 10-fold greater absorbance compared to AuNS. The below examples demonstrate usefulness of AuNFs in biological applications (drug delivery and control of cellular membrane potential) and the superiority of AuNFs over AuNS in these applications.

EXAMPLES

Nanoparticle Synthesis

AuNF synthesis used thioctic acid (TA), thioctic acid-$NH_2$ (TA-$NH_2$), TA-nitrilotriacetic acid (TA-NTA), TA-polyethylene glycol-COOH (TA-PEG-COOH) or TA-polyethylene glycol-$NH_2$ (TA-PEG-$NH_2$) as ligands, L-ascorbic acid as reducing agent, and sodium hydroxide for pH-dependent control of AuNF cluster size in aqueous phase. First, 200 µL ($2.0\times10^{-5}$ mol) of 100 mM tetrachloroauric (III) acid ($HAuCl_4 \cdot 3H_2O$) aqueous stock solution, the desired amount of 2M sodium hydroxide (NaOH) ($2.5\times10^{-6}$ ~ $2.0\times10^{-5}$ mol) and the desired amount of 100 mM aqueous ligand solution ($2.5\times10^{-6}$ ~ $1.0\times10^{-5}$ mol) were added to the 50 mL of deionized water. The reaction mixture was vigorously stirred at room temperature for 5 min and the desired amount of freshly prepared 200 mM L-ascorbic acid aqueous solution ($6.0\times10^{-5}$ ~ $2.0\times10^{-4}$ mol) was added to the reaction mixture, followed by stirring for next 3 hours at and keeping for additional 24 hours for aging without agitation in room temperature. The successful synthesis of AuNFs was confirmed by the red shift of the surface plasmon band peak and the decrease of the ascorbic acid and aurate peaks in the near UV region (<300 nm) using UV-vis spectroscopy. The final AuNS sizes were confirmed by TEM and DLS measurements. For the long term storage of AuNFs, we washed the reaction solution to remove ascorbic acid and other residual chemicals using a centrifugal membrane filtration device (50 kDa molecular weight cut-off, Millipore Corporation, Billerica, MA) and deionized water.

Comparative AuNS were synthesized as previously described [see ref 10]. For 10 nm seed AuNSs, 200 µL ($2.0\times10^{-5}$ mol) of 100 mM tetrachloroauric (III) acid ($HAuCl_4 \cdot 3H_2O$) aqueous stock solution and 200 µL ($2.0\times10^{-5}$ mol) of 100 mM of citric acid aqueous solution were added to 50 mL of deionized water and the reaction mixture was vigorously stirred at room temperature for 5 min. Then, 200 µL ($4.0\times10{-5}$ mol) of 200 mM L-ascorbic acid aqueous solution was added to the reaction mixture, followed by vigorous stirring for 30 minutes. Next, the growth solution was prepared with 0.4 mM tetrachloroauric (III) acid and 0.8 mM sodium citrate in 50 mL of deionized water. To synthesize 20 nm AuNSs, 7 mL of seed AuNS solution was added to the growth solution followed by addition of L-ascorbic acid (2 mM final concentration). The reaction mixture was stirred for 3 h at room temperature and kept without stirring for additional 24 hours to complete the AuNS synthesis reaction and deactivate the L-ascorbic acid. The successful synthesis of AuNSs was confirmed by the red shift of the surface plasmon band peak and the decrease of the ascorbic acid and aurate peaks in the near UV region (<300 nm) using UV-vis spectroscopy. The final AuNS sizes were confirmed by TEM and DLS measurements.

Control of Nanoparticle Properties

Varying the amount of ligands has been a traditional way to tune the final size of NPs as demonstrated in a previous synthesis of AuNS (<10 nm) with strong reducing agents and thioctic acid (TA)-based bidentated ligands [see ref 10]. Both the rapid reduction and a strong gold-thiol interaction promoted the nucleation of new NPs instead of size growth of the existing NPs. Syntheses of anisotropic NPs, on the other hand, mostly involve weakly binding ligands and weak reducing agents. A slower reaction rate promoted NP growth instead of fast nucleation while shape directing agents bind to high-energy surface to induce anisotropic growth of nuclei. In most seed-mediated syntheses of anisotropic NPs, varying the ratio of ligands to gold precursor resulted in morphological changes such as a tunable aspect ratio. When aurate ions were reduced with ascorbic acid in the presence of TA-based bidentate ligands, three dimensional branched structure with multiple protuberances (also termed "pods") were produced, which are referred to as gold nanoflower (AuNF). Varied amounts of TA-based bidentate ligands and sodium hydroxide were examined.

First, the concentration ratio of TA (thioctic acid) ligand to aurate ion ($R_{ligand}$=[ligand]/[Au]) was examined for effects on the structure and size of AuNF. The concentration of $HAuCl_4$ was fixed at 0.4 mM. At $R_{ligand}$=0.5, the diameter of AuNF was 20±2.8 nm and they tended to have around five to seven rounded pods each (FIG. 1A). At a lower ligand to Au ratio ($R_{ligand}$=0.25), AuNF was larger (39±3.1 nm) and each tended to have more than around 20 pods per AuNF (FIG. 1B). Although decreasing $R_{ligand}$ led to a larger size of AuNF with the larger number of pods, the average pod size was similar. Under high-resolution TEM, pods of AuNF showed two lattice fringe spacings (ca. 0.144 and 0.235 nm) indicating (110) planes and (111) planes of typical gold face-centered-cubic (fcc) structure. The growth direction of pods of AuNFs was along the <110> direction, consistent with the previous report for the tip in gold nanostar. At higher ratio $R_{ligand}$ >0.5, AuNF with similar size (~20 nm) were formed but with a larger amount of small nuclei (~2 nm); thus resulted in smaller average sizes (see table in FIG. 7).

Surface plasmon resonance (SPR) absorbance of AuNF at $R_{ligand}$=0.5 peaked at 550 nm ($\lambda_{short}$) which is longer wavelength compared to that of similar sized gold nanosphere (AuNS) ($\lambda$~520 nm). Another peak occurred near 650 nm ($\lambda_{long}$) which can be attributed to the anisotropic structure of AuNF. This $\lambda_{long}$ peak was not observed after 30-min addition of reducing agent, but developed over time and transitioned from 590 nm at 2 h (with full-width half maximum (FWHM)=115 nm) to 650 nm at 24 h (FWHM=160 nm). After 24 h of reaction, the $\lambda_{long}$ became the primary absorption peak. No changes were observed after 24 h, which indicates the completion of anisotropic growth of AuNF. TEM also confirmed that the amount of nuclei decreased while a larger proportion of AuNF show more protruding pods over time. Assuming that the reaction yield is 100%, calculated extinction coefficient would be ~ $7.7\times10^8$ $M^{-1}$ $cm^{-1}$ for AuNF which is similar to 20-25 nm gold nanostar (approximately 6 to $7\times10^8 M^{-1}$ $cm^{-1}$) At $R_{ligand}$=0.25, the SPR peaked at 550 nm. $\lambda_{long}$ was less prominent because pod size was similar despite larger overall size of AuNF, making the impact of pod on the $\lambda_{long}$ peak smaller. At larger ratios of $R_{ligand}$ (>0.5), the absorbance of the $\lambda_{short}$ peak decreased while the $\lambda_{long}$ peak shifts from 700 nm ($R_{ligand}$=0.63) to 750 nm ($R_{ligand}$=1). The red-shift of the $\lambda_{long}$ peak indicates the increase in the anisotropy of AuNF compared to smaller NF sizes. This follows general rule that a large amount of ligands suppresses the growth of gold nanoparticles and the resulted size often found smaller especially with TA-based bidentate ligands [see ref 10].

The ability to tune the surface properties of NPs is critical for further conjugation to biomolecules as well as for the colloidal stability under various conditions. From a library of TA-based ligands [see refs. 8-12], five different types of ligands were selected having a dithiol anchoring group on one end for gold surface binding, various terminal functional groups (carboxylic acid (TA), branched carboxylic acid (TA-NTA), and amine (TA-NH$_2$)) on the other end. Also tested were the effect of adding a poly(ethyleneglycol) (PEG) spacer (TA-PEG-COGH and TA-PEG-NH$_2$, molecular weight of PEG~600) into the TA-based bidentate ligands. Using these ligands, the influence of surface ligand design such as terminal functional groups and length was examined for impact on the structure of AuNF. Under the same conditions ($R_{ligand}$=0.5), all TA-based bidentate ligands yielded AuNF (FIG. 1C). Interestingly, the pod shapes and NP sizes were affected by ligand structures. Overall size ranged from 20 to 40 nm and the pod size from 10 to 15 nm (see table of FIG. 7). Converting the terminal group of the ligand from COOH (TA) to NH$_2$ (TA-NH$_2$) increased the diameter of AuNF from 20±2.8 nm to 37±7.0 nm and resulted in elongated pods. These changes could be attributed to different electrostatic interactions of Au with the terminal amine group of TA-NH$_2$ compared that with the terminal carboxyl group in TA as well as mild etching of NP surface by positively charged amine terminal group. The ligands with branched carboxylic terminal groups (TA-NTA) resulted in similar pods shape and NP size (22±3.1 nm) to that of AuNF with TA. Adding PEG spacer in the ligand design (TA vs. TA-PEG-COOH) resulted in AuNF with similar size (23±3.9 nm) but with relatively flat pods because bulky ligands physically block the access of precursors to the NP surface for pods growth. This observation indicates that PEG may physically block the access of nuclei to AuNF surface, yet a lower packing density of PEG-containing ligands allows the growth of relatively flat pods in unoccupied surface of AuNE Converting the terminal group from COOH to NH$_2$ in PEG-containing ligands (TA-PEG-NH$_2$) led to AuNF size of 30±3.5 nm with elongated pod shape, consistent with the changes observed when replacing TA with TA-NH$_2$ for the AuNF synthesis. The UV-Vis spectroscopy from AuNFs with all types of ligands showed LSP peaks at >550-nm, peaks at longer wavelength than similar size of AuNS. Using mercaptoundecanoic acid (MUA) in the AuNF synthesis, despite the same reaction conditions, led to less prominent pods and low anisotropic absorption spectrum. This is because MUA has monothiol (rather than dithiolate in TA-ligand) and long alkyl chain that promote close-packing of MUA on Au surface and hence cause more hindrance for AuNF to grow and form branched structure (pods).

Synthesis of nanoparticles greater than 50 nm in size nanoparticle is important because of their improved long-wavelength adsorption and optical properties compared to smaller NPs. Since varying $R_{ligand}$ (with fixed [Au]=0.4 mM) resulted in AuNF with 20~40 nm, [OH$^-$] was adjusted to produce larger AuNF. It was expected that stronger acidity of the reaction solution would promote the fusion of small nuclei to make larger NPs.

Figure 2A:
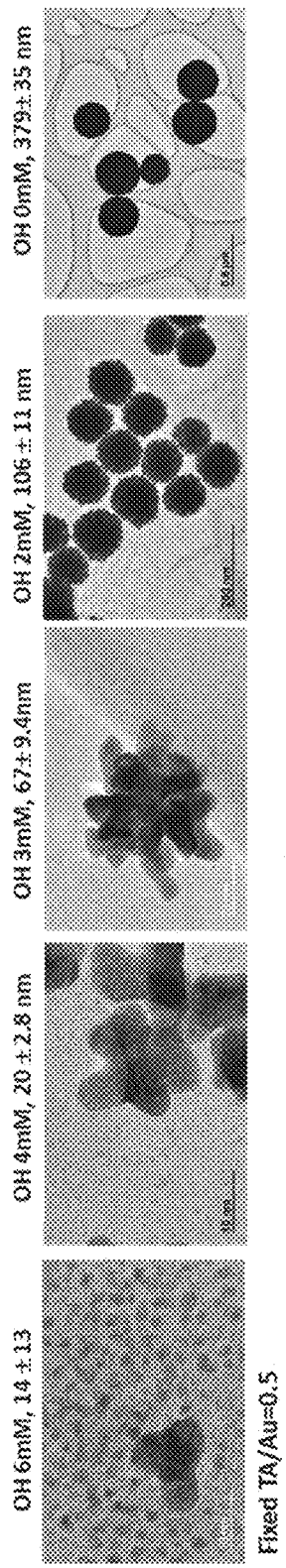
FIGS. 2A-2D show acidity-mediated size control of AuNE FIGS. 2A and 2B provide (A) TEM images and (B) UV-Vis spectroscopy of AuNF with decreasing concentration of OH from 6 mM to 0 mM.

FIG. 2A shows representative TEM images of AuNFs at varied NaOH concentration with fixed $R_{ligand}$=0.5. A strong effect of [OH$^-$] was seen on the AuNF size: a higher hydroxide ion concentration led to a smaller AuNF size. The smallest average size of AuNF (14±13 nm) was produced at the highest concentration of NaOH (6 mM) where we also observed many nuclei (~2 nm). At high [OH$^-$], solution color rapidly changed from red to transparent indicating faster reaction because of a strong binding between gold and thiol.[10-13] In the medium range of [OH], the size of AuNF were 67±9.4 nm ([OH$^-$]=3 mM) and 106±11 nm ([OH$^-$]=2 mM). The largest AuNF (379±35 nm) was produced without addition of NaOH during synthesis reaction. Despite large sizes, these AuNF showed a similar surface curvature (or size of pods) to smaller AuNFs. A lower [OH$^-$] leads to relatively large size of AuNF potentially via agglomeration of nuclei.

The large AuNF showed strong gold scattering color with purple colloidal color corresponding to a $\lambda_{long}$ peak near 600 nm (FIG. 2B), a characteristic peak from large NP size. In the medium range of [OH], AuNF showed peaks at around 574~578 nm with narrower FWHM (161~155 nm), indicating more symmetric shape was observed in the TEM images (FIG. 1A). The small AuNFs (14 and 20 nm) showed an absorption peak between 600 and 700 nm with a wider FWHM (full-width half maximum, >200 nm) (FIG. 2A, left). This longer-wavelength surface plasmon resonance (SPR) indicates the effect of elongated pods of AuNF. Color differences were also seen in samples on the benchtop, with images presented in FIG. 3C. The small AuNFs had a dark tin-blue colloidal color while The larger AuNFs synthesized seemed to develop different color from blue-purple to light blue (or cyan) with increasing iridescent scattering color and corresponding stronger abroad absorption in NIR, a characteristic from large NP size.

Figure 2B:
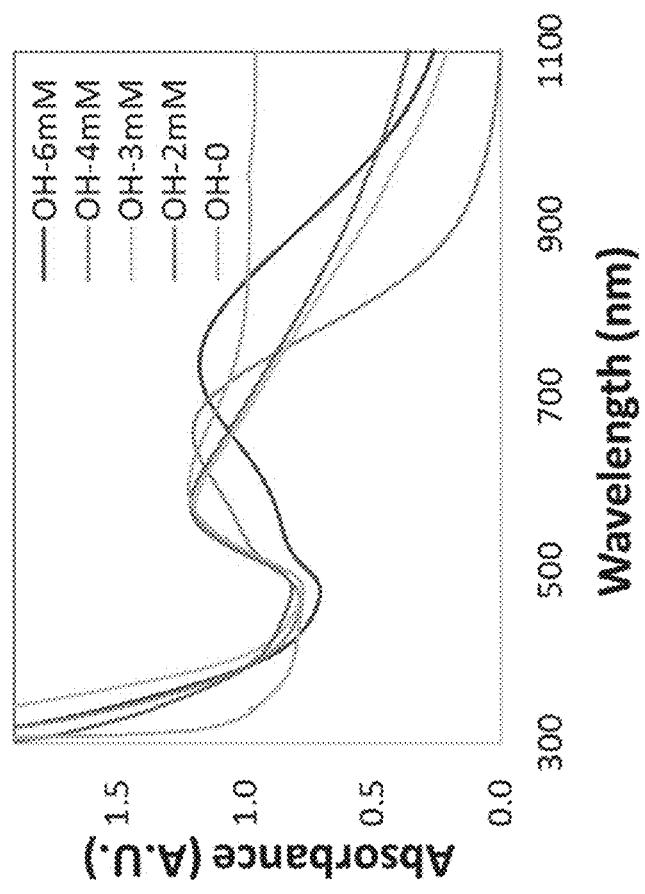
Figure 2C:
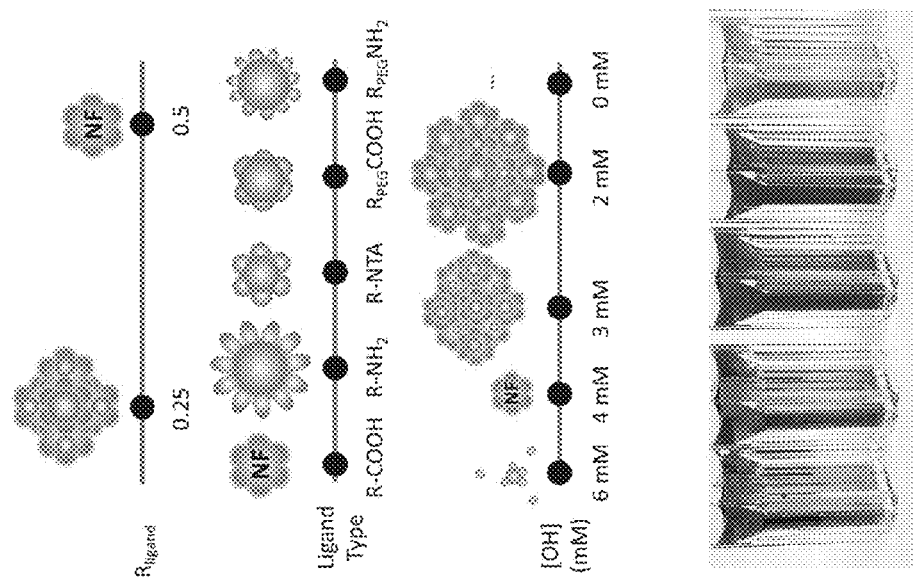
Figure 2D:
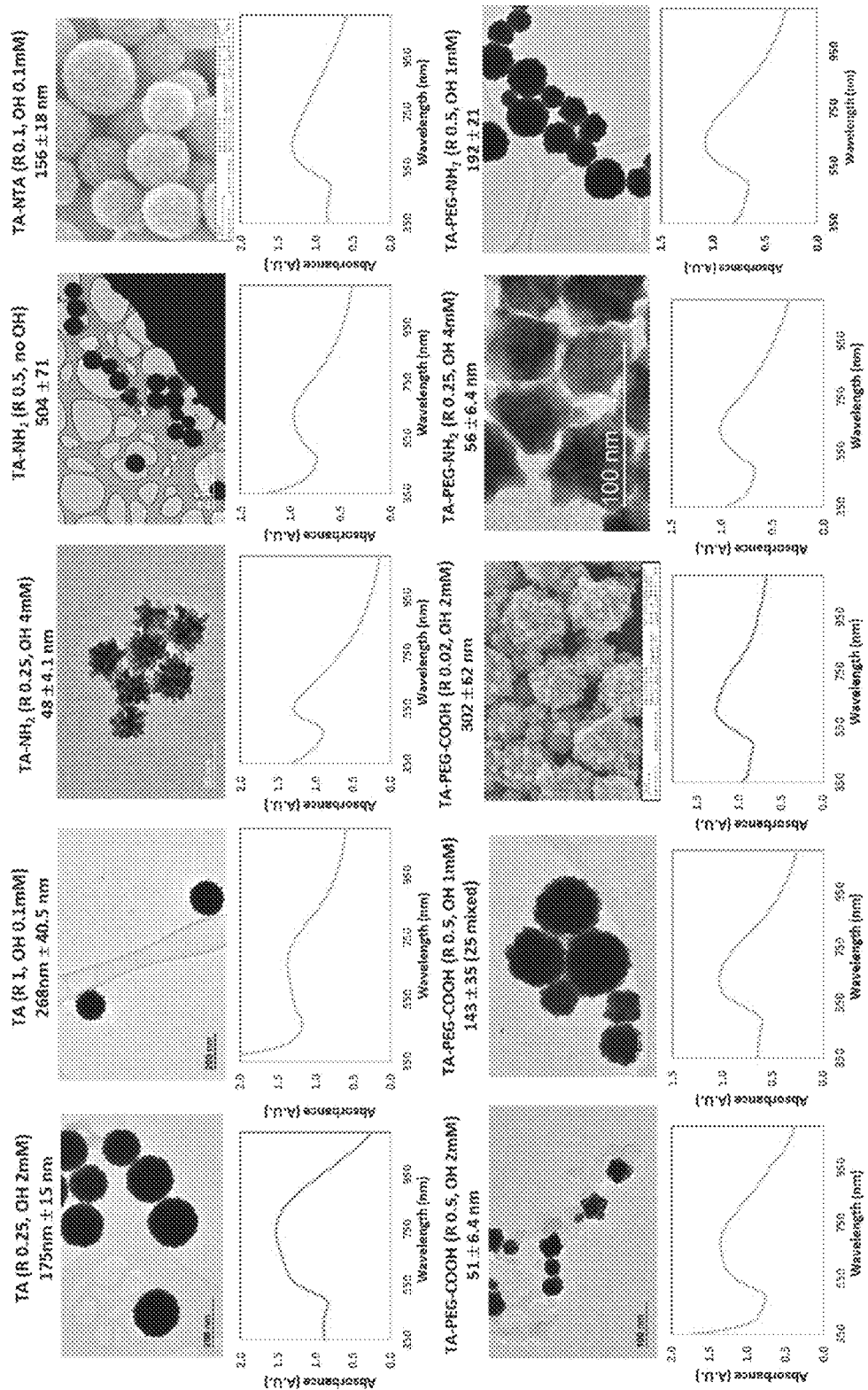

Separately, the intermediate states of size evolution at low [OH$^-$] under the slow reaction condition ($R_{ligand}$=0.25, [OH$^-$]=2 mM, 1 hour reaction at 10° C.) were confirmed. Large variations in AuNF sizes and fusion amongst AuNFs to form larger AuNF (d~170 nm) were both seen. The observed size of AuNF (d~50 nm) was similar to the AuNF at the same ligand concentration but with standard reaction condition ($R_{ligand}$=0.25, [OH$^-$]=4 mM, 24 hours reaction at 20° C.). The effect of hydroxide on the AuNF size was also observed with different types of ligands. The AuNF size varied from 100 nm to 500 nm: the size increased with lower [ligand] and [OH$^-$] (FIG. 2D). Also, less protruding pods with PEG-containing ligands were consistent with observations and more dramatic in large AuNE The absorption spectrum showed red shifts of the $\lambda_{short}$ peak in larger AuNF, large absorption in long wavelength than AuNS with similar sizes due to the anisotropic features from pods in AuNE All of the as-synthesized AuNFs were stable in solution and could be stored for months without significant morphological changes.

Numerical Analysis and Simulation

Figure 3A:
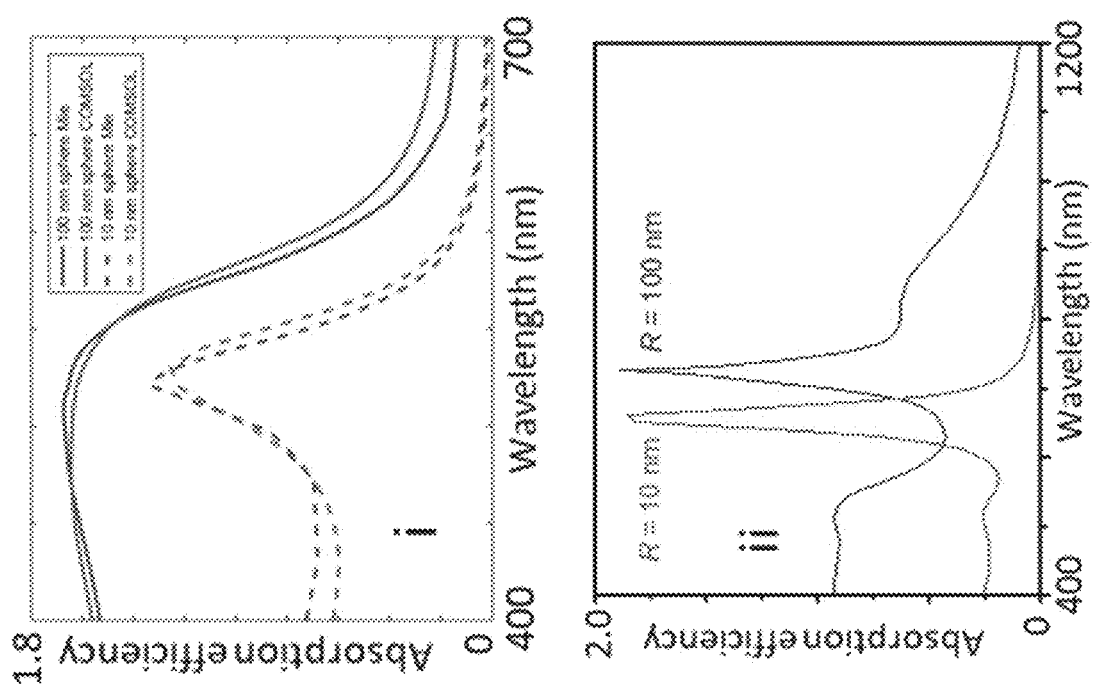
FIGS. 3A-3C show theoretical modeling of AuNS and AuNE FIG. 3A provides absorption spectrum: (i) Validation of FEM model: absorption efficiency calculations for a AuNS with 100 nm radius (solid lines) and 10 nm radius (dashed lines) using Mie scattering (blue) and COMSOL (orange). (ii). Calculated absorption efficiency for AuNF, whose quarter-geometry is shown in B (iii-iv), with nominal $R_0$=100 nm radius (blue) and 10 nm radius (red). Electric field models for AuNS and AuNF are displayed in FIG. 3B. All E-field plots are normalized to the maximum of the AuNS at its 520 nm wavelength absorption peak $|E|_{max}$=1.5 V/m. (i) E-field norm of AuNS with $R_0$=100 nm quarter section at the AuNS 520 nm absorption peak wavelength. (ii-iii) E-field norm of AuNF with nominal $R_0$=100 nm quarter section at (iii) 520 nm and (iv) AuNF 725 nm resonance wavelength. (iv) E-field norm of AuNF with nominal $R_0$=10 nm quarter section at 650 nm resonance wavelength.
Figure 3B:
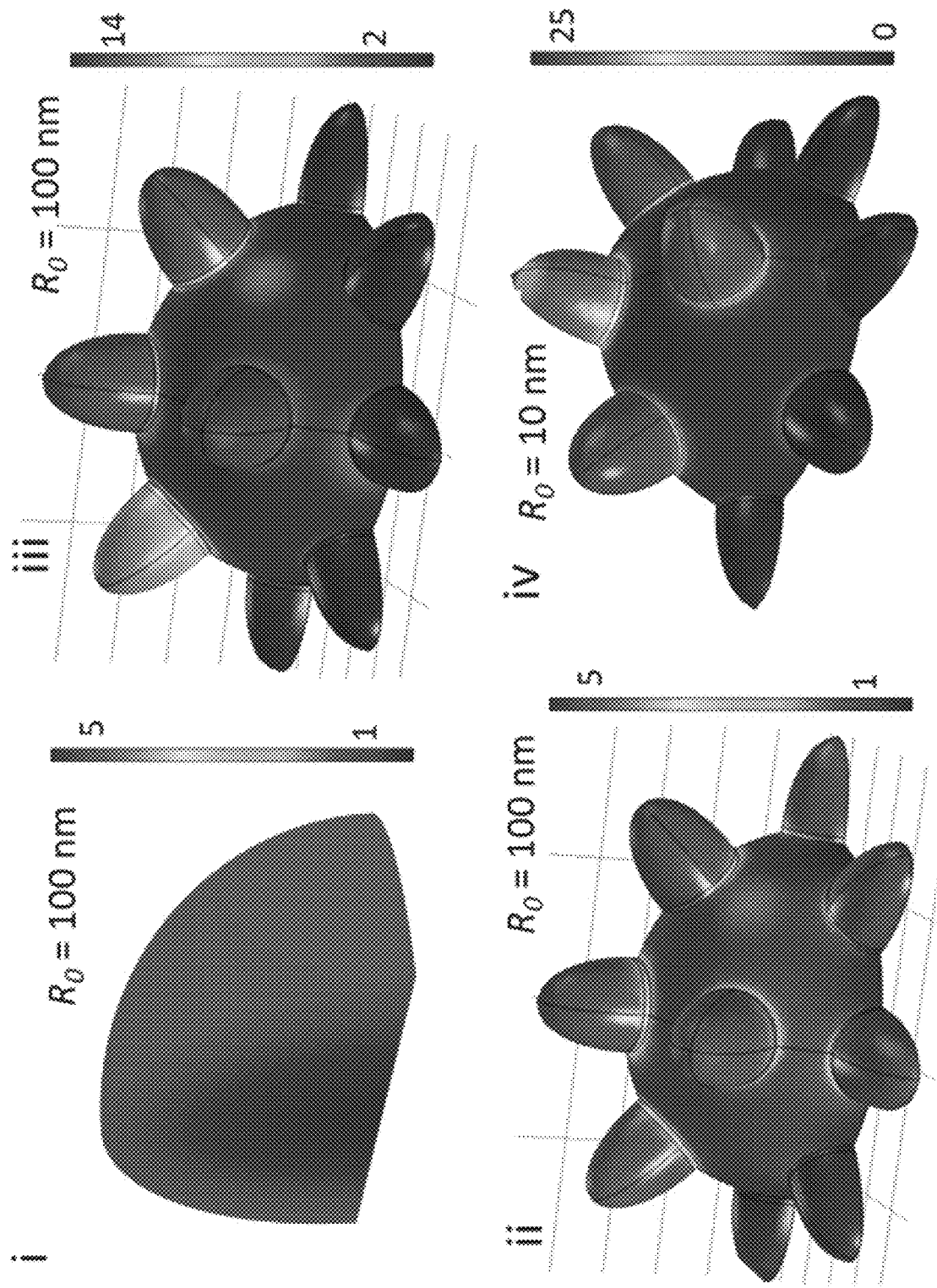
Figure 3C:
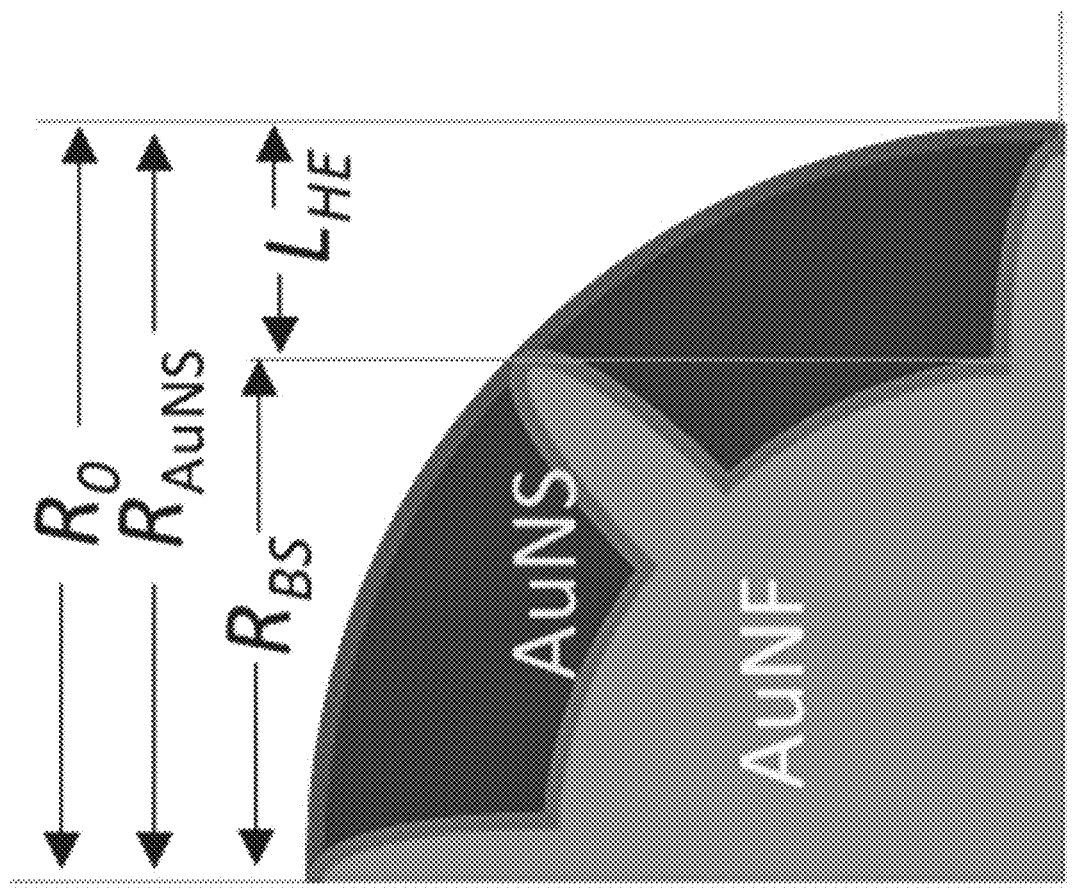

FIGS. 3A through 3C show the finite-element method (FEM) modeling results for representative sizes of AuNSs and AuNFs. FIG. 3A(i) compares the FEM model to Mie theory results and shows that they agree well, which indicates that the FEM model can be expected to yield accurate results for more complicated structures, such as AuNFs. FIG. 3A(ii) shows the absorption spectrum for AuNFs with nominal radius $R_0$=10 nm and $R_0$=100 nm. Compared to the AuNS absorption spectra of FIG. 3A(i), the AuNF spectra show a large, sharp peak at a slightly longer wavelength than the similarly sized AuNS. This absorption peak can be seen in the experimental results, albeit significantly broadened due to the asymmetry of the experimental AuNFs compared to the FEM model. Further, comparing FIG. 3A(i) and (ii), the absorption efficiency in the short wavelength (blue-green, $\square_{short}$) part of the spectrum is reduced for a AuNF compared to a similarly sized AuNS. This reduction may be attributable to the decreased Au volume in the AuNF, which has gaps between the protuberances not present in the AuNS, as shown in FIG. 3C. However, the general trends of the AuNS and AuNF are similar at shorter wavelengths for comparable AuNP sizes. For example, for $R_0$=100 nm, the AuNS and AuNF absorption spectrum is relatively flat below 550 nm, where it starts to fall off. This ~550 nm absorption peak is due to the dipole mode of the AuNS in the $R_0=10$ nm case and the quadrupole mode in the $R_0=100$ nm case.

This relative decrease in short-wavelength absorption for AuNFs compared to AuSSs is more than compensated by the large resonant absorption peak at longer wavelengths (Q long) that is present in AuNFs, which was well matched to the experimental trend (see absorption spectra in FIGS. 1 and 2). The resonant absorption peak in AuNFs is related to the electric field enhancement at the base and tips of the half-ellipsoidal protuberances. This enhancement effect and field localization is visible in FIG. 3B(ii-iv), which shows a 5-25× increase in electric field maximum for a AuNF relative to AuNS at the peak absorption wavelength of the AuNS (FIG. 3B(ii-iv)). The E-field enhancement translates to increased absorption, which should, in turn, translate to increased heating of the AuNF.

For the photothermal use of AuNF, a coupled multiphysics simulation of the flow of heat due to the absorbed power would require additional computational resources but we can deduce the major thermal effects from the FEM simulations and general principles. On a time scale much shorter than needed to conduct the heat away from the plasmonic hotspots, the temperature increase should be proportional to the absorbed intensity. Some temperature increase near the hotspots will persist even in the steady-state limit, although the temperature difference is expected to be much smaller. For a AuNS, the heat deposition is uniform on the surface of the particle, while for the AuNF, large temperature gradients should be present with the hotspots at the base and tip of the protrusions. According to the simulations, the electric-field intensity at these hotspots is a factor of 5-25 larger than at the surface of the nanospheres. However, the exposure or excitation used here is much longer (2.2 S per pixel) than hotspot dissipation (<nanosecond), we can apply same steady-state assumption for both AuNS and AuNF in terms of photothermal heat dissipation to estimate the temperature increase near AuNPs Membrane-Impermeable Drug Delivery Using Photoporation of AuNF Penetration of cellular membrane is critical for delivery of therapeutic molecules into cytosol and nucleus of cells to control cellular function and behavior. Although the traditional pathway—cellular uptake followed by the endosomal escape of nanoparticle-based carriers—has shown some enhancements in the drug potency, endosomal entrapment and lysosomal degradation significantly decrease the activity and local concentration of the drugs at the targeted cellular organelles. Alternatively, direct delivery of drugs into cytosol can be achieved by transiently perforating cell membrane through, for example, electric potential. Nevertheless, this electroporation lacks the spatial control and causes adverse side effects such as death of irrelevant (healthy) cells in cancer therapy. In contrast, photothermal effect of AuNP can induce localized heat to perforate cell membrane without raising the bulk temperature. Thus, the photothermal effect of AuNF under long-wavelength laser to increase the cell permeability was examined. AuNF is advantageous because of (1) a large absorption cross-section at long-wavelength (>650 nm); (2) enhanced electric field due to shape anisotropy; (3) morphological and colloidal stability under physiological conditions; (4) a wide range of capping ligands to conjugate biomolecules for cell membrane binding; and (5) biocompatibility Two plasma membrane-impermeable molecular cargos (Eth1-D and DAPI) were used as model drugs in intracellular delivery demonstrated using photoporation/photothermal heating. This concept is depicted schematically in FIG. 4C. EthD-1 and DAPI dyes were used as model cell-impermeable compounds because these molecules are highly charged and hydrophilic; and thus not readily penetrate cellular membrane.

The AuNF were compared to traditional gold nanospheres (AuNS). In preparation for the modification of the AuNS with PEG-cholesterol, the AuNPs were first ligand-exchanged with mixed TA to present COOH functional group on the surface with same as TA-capped AuNF 20 nm as comparison. Briefly, 10 mL of citrate-modified 20 nm AuNPs, were mixed with 25 μL of 100 mM stock of the ligand stock solution and the solution adjusted to pH 8 using NaOH. The reaction solution was stirred for 8 h and the AuNP dispersion was purified from free ligands through multiple washes using a centrifugal membrane filtration device (50 kDa molecular weight cut-off, Millipore Corporation, Billerica, MA) and deionized water. AuNP concentration was determined using the molar extinction coefficient of 20 nm AuNP ($8.80\times10^8$/M/cm at 520 nm for AuNS, ~ $7.7\times10^8$ $M^{-1}$ $cm^{-1}$ at 640~650 nm for AuNF based on the absorption measurement and the assumption of 100% reaction).

Figure 4A:
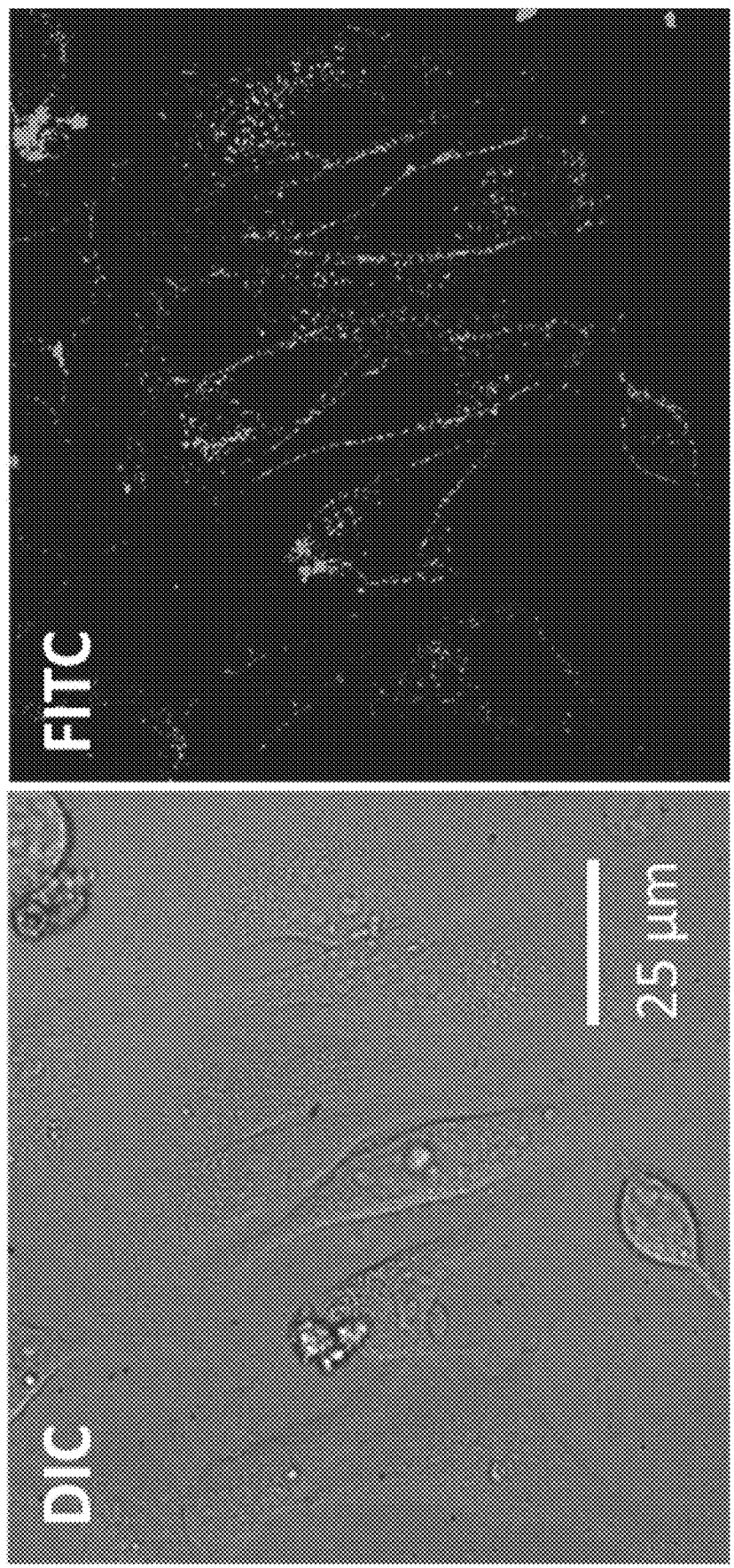
FIGS. 4A-4D illustrate properties of AuNF—PEG-FITC/Chol and its use for photothermal cell penetration. The images in FIG. 4A are of differential interference contrast (DIC) and confocal fluorescence of HeLa cell and AuNP—PEG-FITC/Chol after 25 min incubation.
Figure 4B:
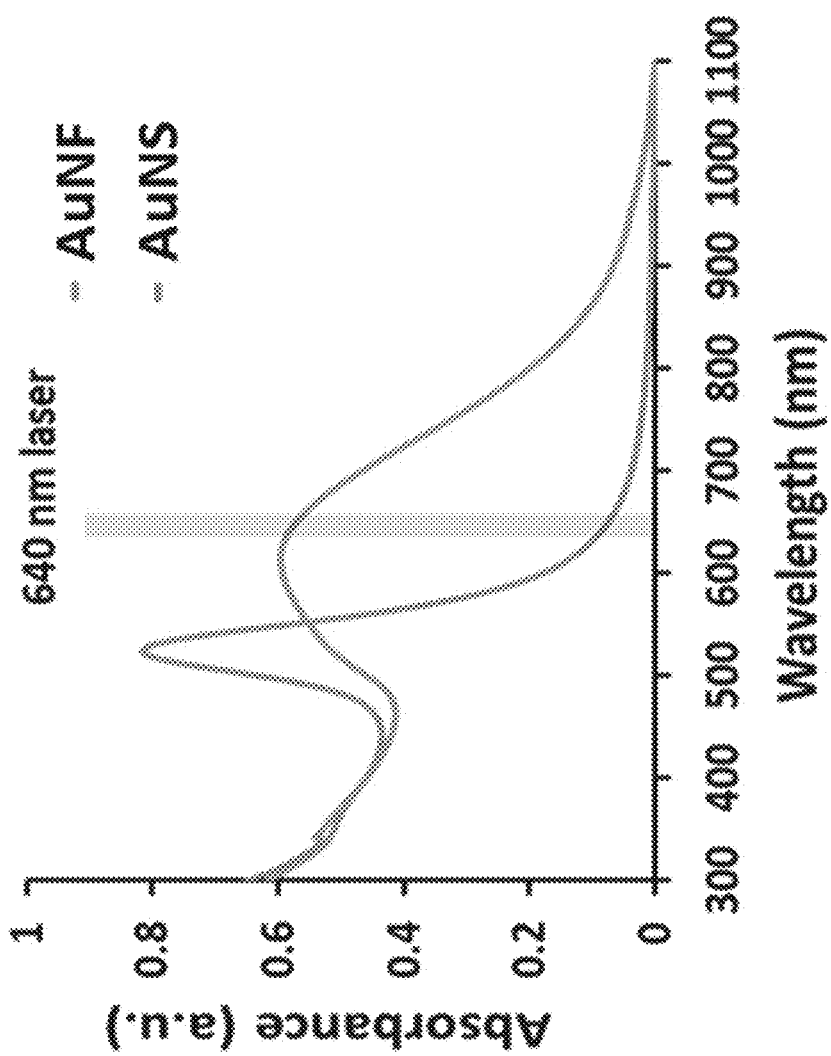
Figure 4C:
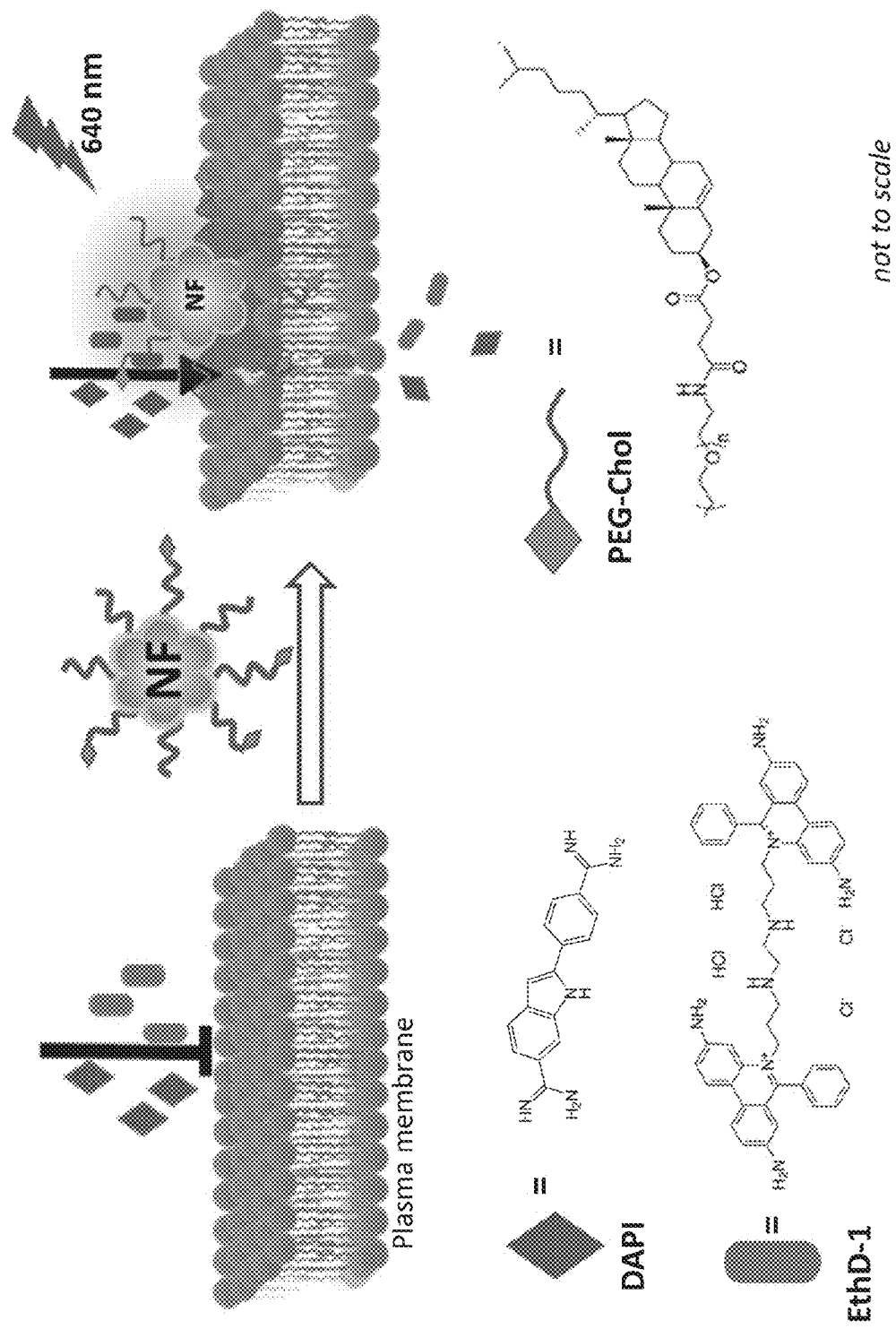

AuNPs with 20 nm diameter to investigate photothermal effect to deliver of membrane-impermeable drug because this size is small enough to be biocompatible without precipitation and demonstrated high absorption efficiency with minimum scattering thus high photothermal effect across visible to NIR region for 20 nm AuNF. Excitation was 640 nm served as proof-of-concept for NR excitation of AuNF, and the relative absorption of 20 nm AuNF was almost 10 times higher than 20 nm AuNS at 640 nm excitation (FIG. 4B). Owing to this efficient absorption of AuNF, it appeared possible that only the photothermal effect of AuNF under this long-wavelength light is sufficient to induce the direct penetration of membrane-impermeable drugs into cells.

Gold nanoparticles were conjugated to polyethylene-glycol-modified cholesterol and a dye. $NH_2$—$PEG_{3400}$-Chol (cholesterol, for membrane tethering) and $NH_2$—$PEG_{2000}$-FITC (fluorescein isothiocyanate, for visualization) conjugated AuNF (AuNF—PEG-FITC/Chol) and AuNS (AuNS—PEG-FITC/Chol) were prepared generally according to the method disclosed in ref 14, incorporated herein by reference for the purpose of disclosing techniques for making conjugated nanoparticles. Briefly, a mixture of $NH_2$—$PEG_{3400}$-Chol and $NH_2$—$PEG_{2000}$-FITC (1:1 mole ratio) was conjugated to acid-functionalized AuNS or AuNF via EDC coupling. After conjugation reactions, the particles were purified and characterized for their spectroscopic properties, electrophoretic mobility, size, and charge distribution. The absorbance spectra of the PEG-FITC/Chol conjugated AuNS and AuNF were similar (FIG. 4B) to the unconjugated varieties (data not shown) with absorption maxima ($\lambda_{abs}$) at 525 nm and 630 nm, respectively, suggesting no secondary aggregation was incurred due to the conjugation of PEG-FITC/Chol moieties on the surface of the particles.

Figure 4D:
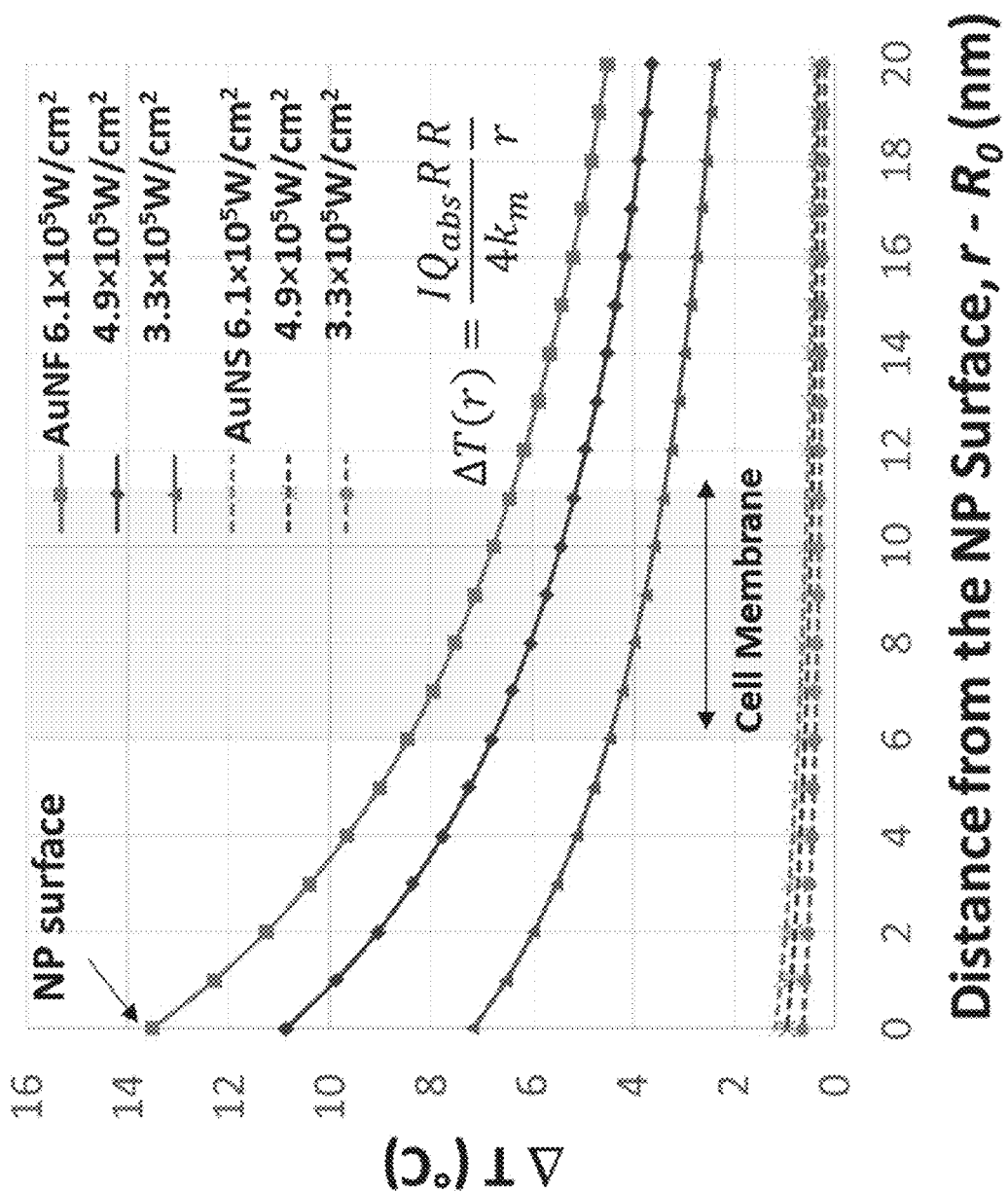

The temperature increase for the experiments can be estimated using the solution of the steady state heat-conduction equation for a AuNPs heat source, assuming that the thermal conductivity of the AuNP is much higher than that of its surroundings. The cells were illuminated in scanning mode for 500 ms using the 640 nm laser every 1 min over a desired time period (0.19 μm² focused spot size, 2.2 μs/pixel, total image size 512×512 pixels). This corresponded to a total image size of ~0.21×0.21 mm. The measured average power density of the laser excitation was measured to be $3.3\sim6.1\times10^5$ W/cm$^2$ and the calculated temperature increases by photothermal effect of AuNPs excited by 640 nm was plotted as a function of distance from the surface of AuNPs in FIG. 4D. Here, R is the AuNP radius (10 nm), r is the distance from the center of the AuNP, I is the intensity of the incident pump in W/cm$^2$, $Q_{abs}$s is the relative absorption cross section normalized to the cross section of the AuNP (i.e. $\sigma_{abs}=Q_{abs}\pi R^2$), and $k_m$ is the thermal conductivity of the surrounding medium. The calculated heat generated by NPs were $7\sim14°$ C. and $0.6\sim1.2°$ C. of temperature increase immediately at the very surface of AuNF and AuNS, respectively. Considering the solution persistence length of the PEG ligand (<7 nm with ~76 repeated chain number of ethylene glycol) and the hydrodynamic size increase (6~8 nm) after conjugation of PEG-Chol for AuNS and AuNF, the maximum temperature increase just at the surface of the cell's plasma membrane (~6 nm from the surface of the AuNP) was estimated to be $4.5\sim8.5°$ C. for AuNF and $0.4\sim0.7°$ C. for AuNS. While the heat generated by AuNF is sufficient to increase the cell permeability, localized heat would not have adverse effects on cells such as phototoxicity.

After 25-min incubation of 1 nM AuNP—PEG-FITC/Chol, EthD-1 and DAPI were added to the sample and their fluorescence intensity monitored inside individual cells while irradiating 640 nm light ($6.1\times10^5$ W/cm$^2$). After 30-min, EthD-1 and DAPI signals of cells bearing AuNF showed significantly stronger signals compared to those with AuNS (FIG. 5A). When plotted as a function of time, EthD-1 signal (FIG. 5B) continuously increased: the signal intensity with AuNF was ~13 times stronger than that with AuNS. DAPI signal (FIG. 5C) was also ~15 times stronger with AuNF—PEG-FITC/Chol, which rapidly increased for the initial 5 min followed by a slower increase. These results demonstrate that a large absorption of AuNF at long-wavelength induces strong photothermal effect and that the resulting kinetics of cellular penetration of molecules are affected by their structures.

Tunable Photothermal Effect of AuNF

Figure 6:
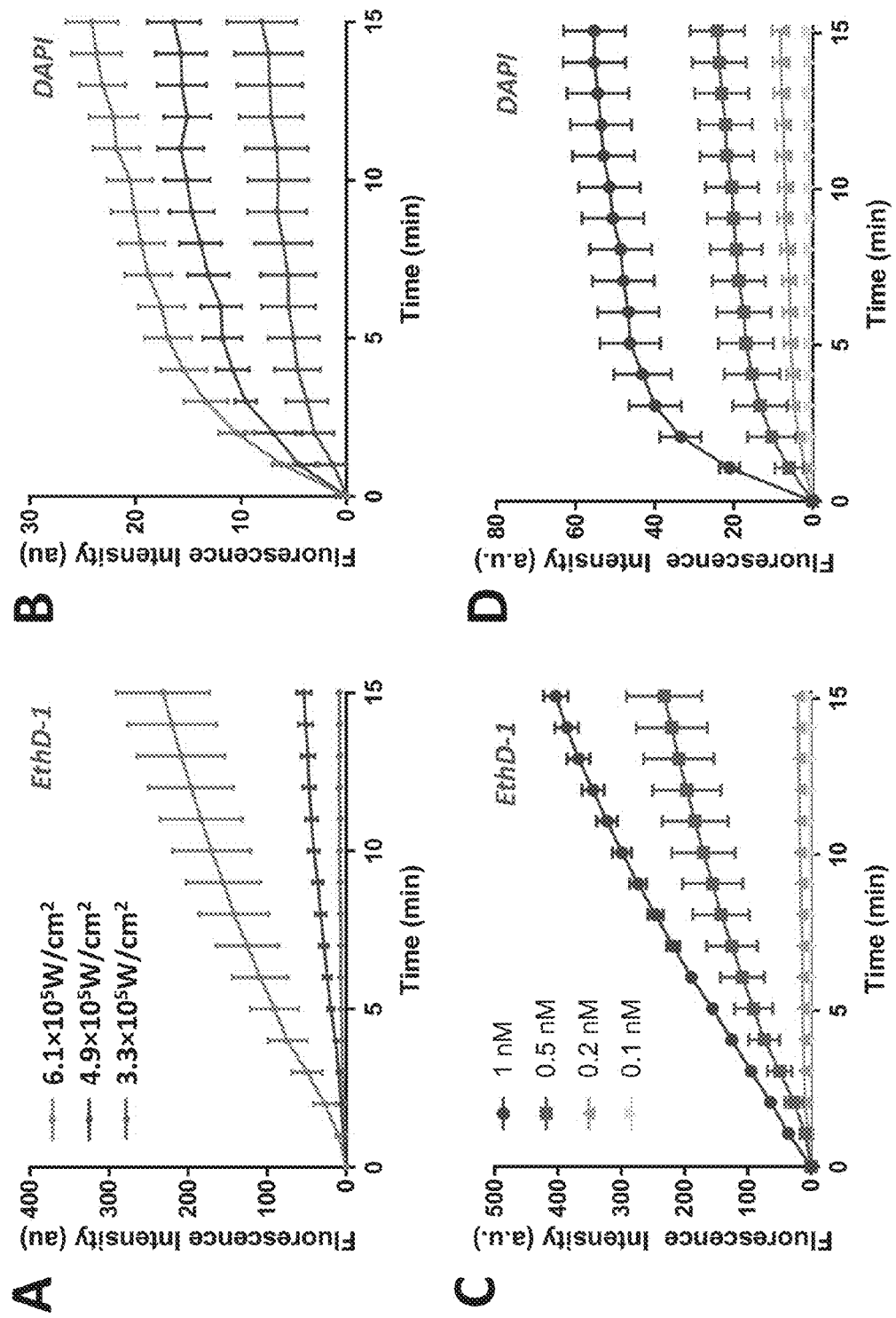
FIGS. 6A-6D present the effects of laser power and NP concentration on the cellular penetration of EthD-1 and DAPI. The penetration of EthD-1 and DAPI was determined by monitoring their signal as a function of time at different laser intensities (FIGS. 6A and B) and the initial NP incubation concentrations (FIGS. 6C and D). The signal intensities were obtained from individual cells (N=40-50).

The possibility was examined that photothermal effect of AuNF might be controlled by laser intensity and the initial nanoparticle concentration. Decreasing the laser irradiation power from $6.1\times10^5$ W/cm$^2$ to $4.9\times10^5$ W/cm$^2$ and to $3.3\times10^5$ W/cm$^2$ after the 25-min incubation of 0.5 nM AuNF—PEG-FITC/Chol resulted in a slower increase of EthD-1 (FIG. 6A) and DAPI (FIG. 6B) signals with time. After 15 minutes of the irradiation, the EthD-1 signal intensity under $6.1\times10^5$ W/cm$^2$ laser (232 a.u.) was 29 times stronger than that under $3.3\times10^5$ W/cm$^2$ laser (9 a.u.). This weak (<4%) EthD-1 intensity under the half of laser power ($3.3\times10^5$ W/cm$^2$) indicates that most of the heat generated by AuNF was insufficient to perforate the cell membrane. DAPI signal under $6.1\times10^5$ W/cm$^2$ laser (24 a.u.) was 3 times stronger than that under $3.3\times10^5$ W/cm$^2$ laser (8 a.u.), which confirms the non-linear and the threshold-like impact of laser power on the cell perforation. Decreasing the initial concentration of AuNF—PEG-FITC/Chol from 1 nM to 0.1 nM led to slower signal increases of EthD-1 (FIG. 6C) and DAPI (FIG. 6D) with time. After 15-min of laser irradiation, HeLa cells incubated with 1 nM of AuNF showed ~300 times (EthD-1) and ~42 times (DAPI) signal intensities, respectively, compared to those with 0.1 nM of AuNF. This is because a lower concentration of membrane-bound AuNF generates insufficient amount of heat for cell penetration. Under all conditions, EthD-1 signal constantly showed a linear increase with time while DAPI signal showed a rapid initial increase at early time followed by the plateau. Also, the influence nanoparticle concentration and laser power on the EthD-1 signal was larger than that on DAPI signal. These differences in the penetration kinetics can be attributed to the size difference between DAPI (277 g/mol) and EthD-1 (857 g/mol): smaller-sized DAPI requires smaller energy to penetrate cell membrane and they can penetrate faster and under weaker irradiation. Considering the minimal phototoxicity of our irradiation conditions, these results demonstrate that the photothermal effect of AuNF can be controlled by the laser intensity and the initial nanoparticle concentration.

Modulation of Cellular Membrane Potential Using AuNF

Figure 8:
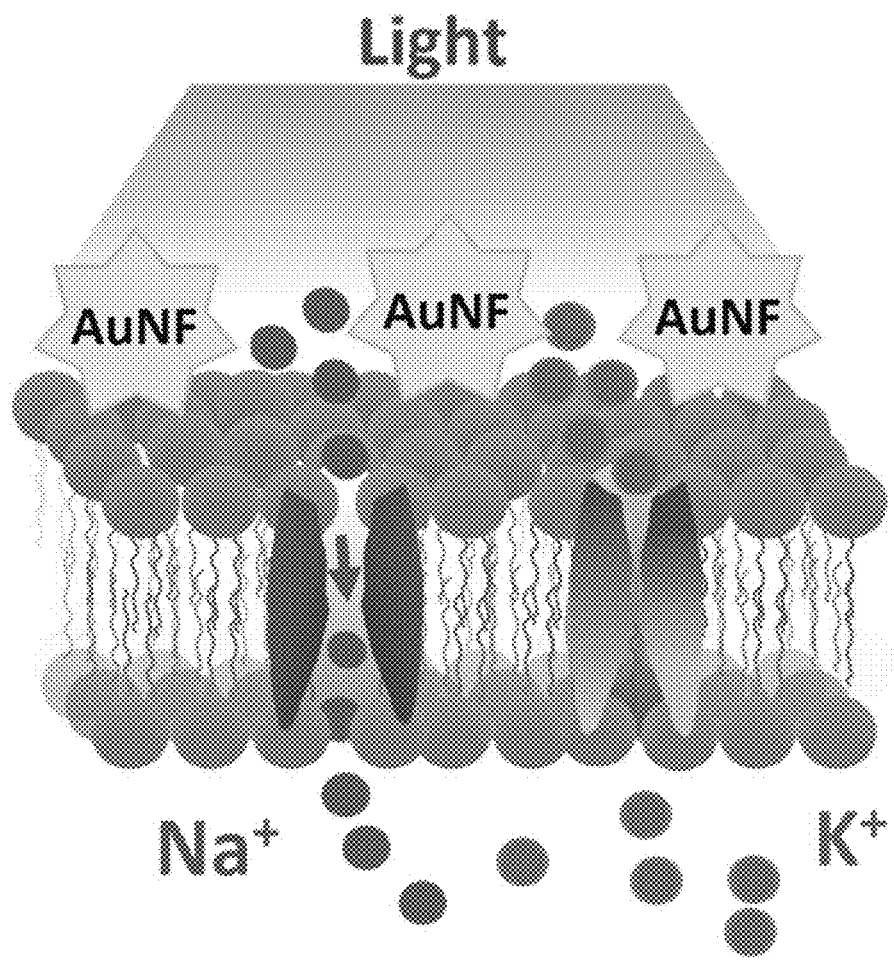
FIG. 8 diagrams photothermal-assisted AuNF-mediated depolarization of membrane potential via opening of voltage-gated sodium channels. AuNFs appended to the plasma membrane (by PEG-Chol) are photoexcited with laser light. Localized heat generated from the AuNF surface is transferred into the plasma membrane and induces the opening of voltage-gated sodium channels, resulting in the depolarization of membrane potential.
Figure 9A:
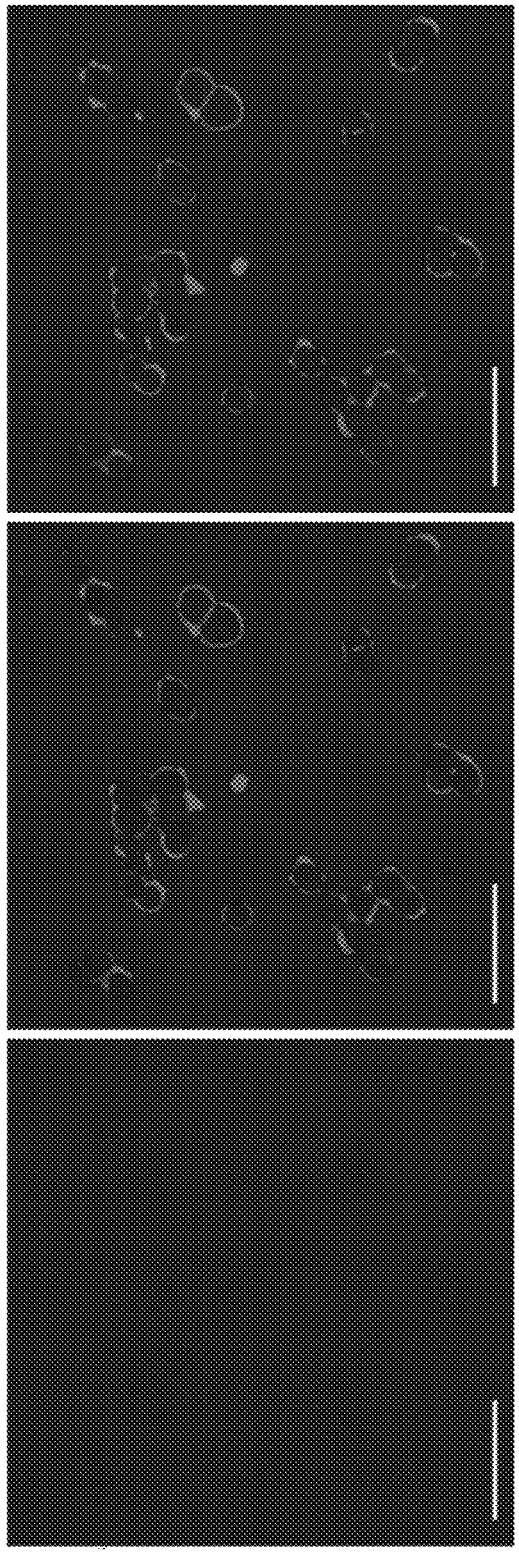
FIGS. 9A-9D illustrate a demonstration of AuNS-Chol and AuNF-Chol localization to the plasma membrane. PC-12 cells were labeled with AuNPs at 3 nM concentration and Rhodamine-PE at 2 µM concentration to identify cellular membranes. Images were captured using a 488 nm laser to capture green fluorescence from FITC dye conjugated to AuNS-Chol and AuNF-Chol, as well as a 561 nm laser to capture Rhodamine-PE (red). The images show that only AuNPs conjugated to PEG-Chol/FITC are able to securely attach to the plasma membrane bilayer as opposed to AuNPs without the PEG-Chol/FITC conjugation. Right: 488 channel, middle: 561 channel, left: channel merge. Scale bar, 50 µm.
Figure 9B:
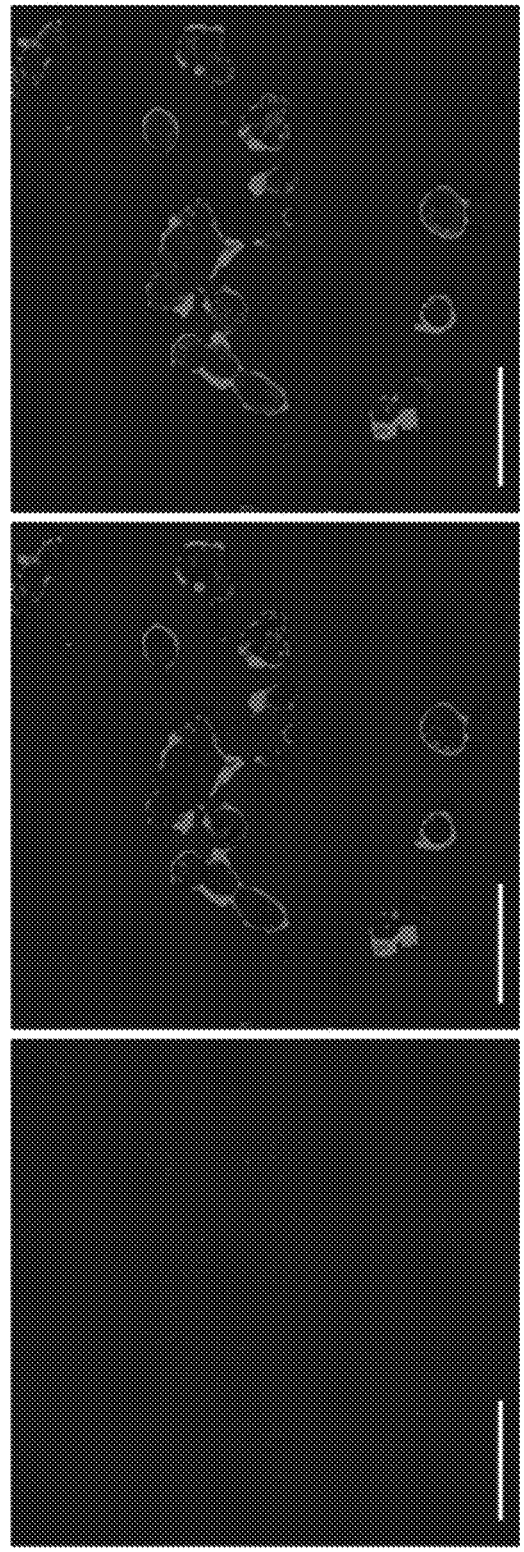
Figure 9C:
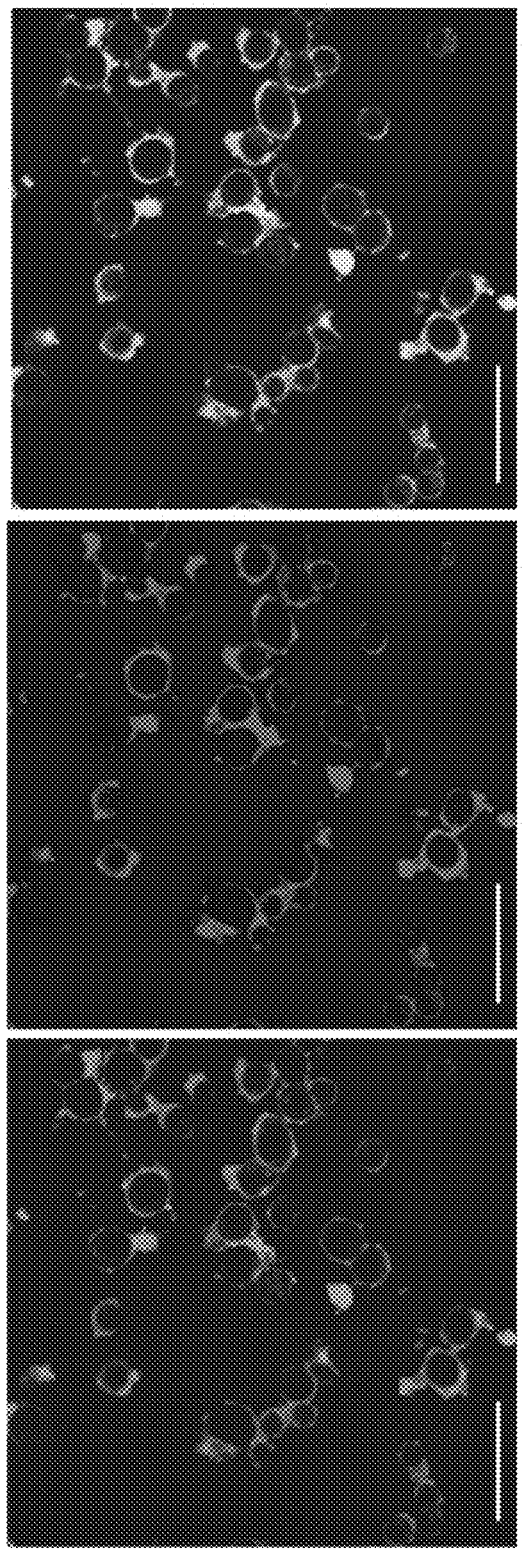
Figure 9D:
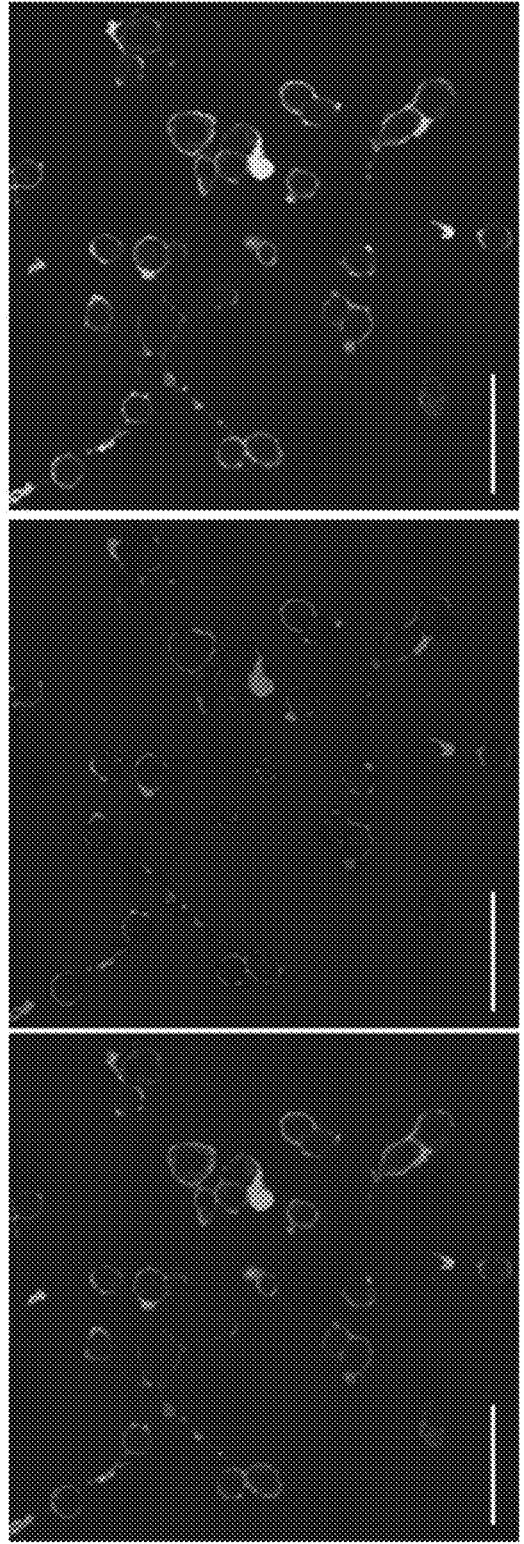

The AuNFs also operated to mediate cellular depolarization through the photothermal-assisted opening of voltage-gated sodium channels. This concept is shown schematically in FIG. 8. Photoexcitation of the plasma membrane-appended AuNFs results in localized heat generation that is transferred into the plasma membrane; this results in the opening of voltage-gated sodium channels and the induction of action potentials in electrically active cells (such as neurons and muscle cells).

First, delivery of AuNSs and AuNFs to the plasma membrane of neuronal-like PC-12 cells was examined. The cells were incubated with AuNS or AuNF (unconjugated) or AuNS/AuNF that were covalently labeled with PEG-Chol (conjugated), prepared as described above. The NPs were also labeled with FITC for visualization. FIGS. 9A-9D shows the specific nature of the labeling where only the PEG-Chol conjugated AuNS and AuNF showed distinct labeling of the plasma membrane while the unconjugated NPs showed no plasma membrane labeling.

Figure 10A:
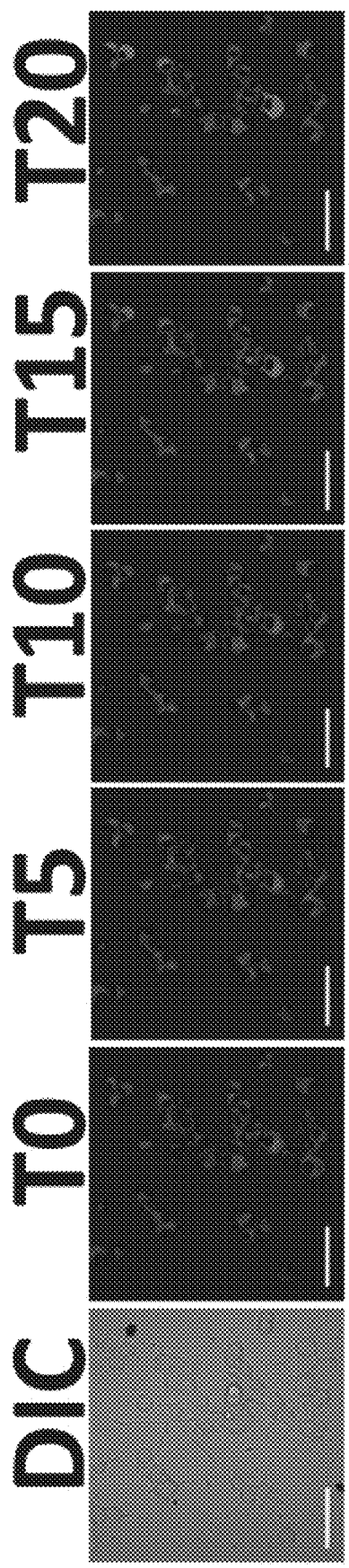
FIGS. 10A-10D show that AuNF-Chol mediates enhanced laser-stimulated cellular depolarization at 640 nm excitation compared to AuNS. Time-lapse images of AuNF-Chol- or AuNS-Chol-mediated membrane depolarization at time points: 0 minutes (T0), 5 minutes (T5), 10 minutes (T10), 15 minutes (T15) and 20 minutes (T20), accompanied by an image taken with differential interference contrast at T0 (DIC). PC-12 cells were labeled with either AuNF-Chol or AuNS-Chol NPs at 1 nM concentration and excited with a laser power density of approximately $2.5 \times 10^4$ W/cm$^2$ every 2 minutes. The membrane potential-sensitive probe DiSBAC$_2$(3) (red) was used to visualize depolarization as enhanced fluorescence. Scale bar, 50 µm.
Figure 10B:
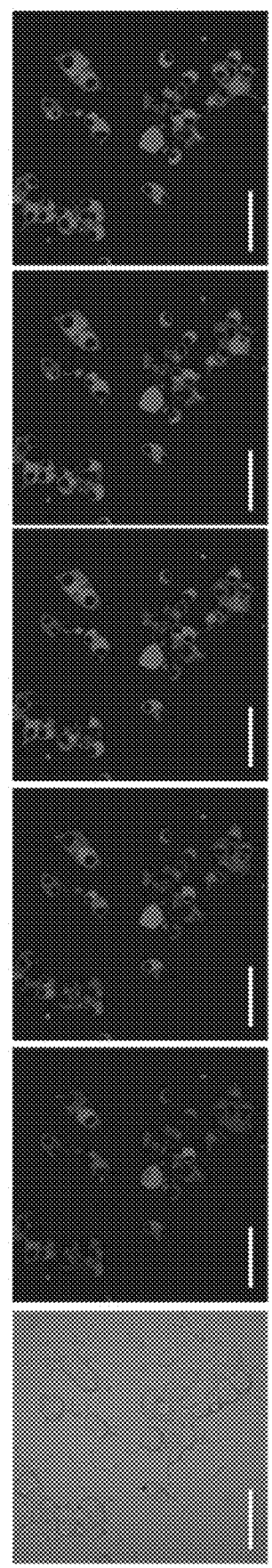
Figure 10C:
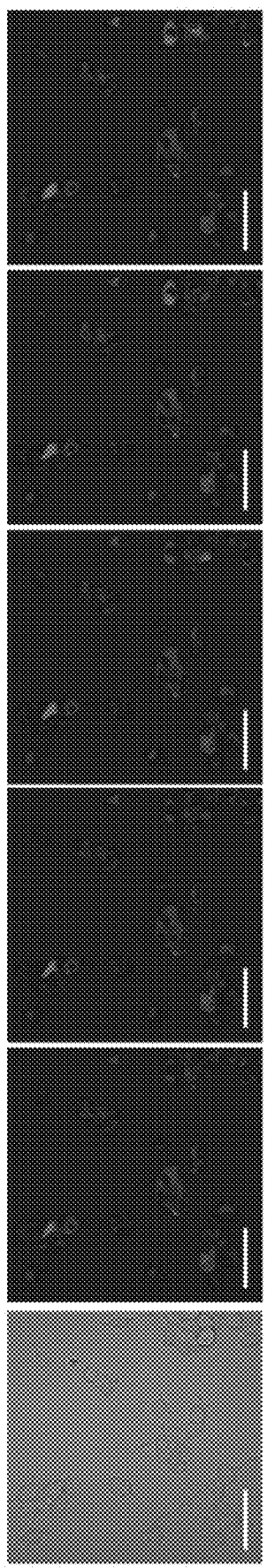
Figure 10D:
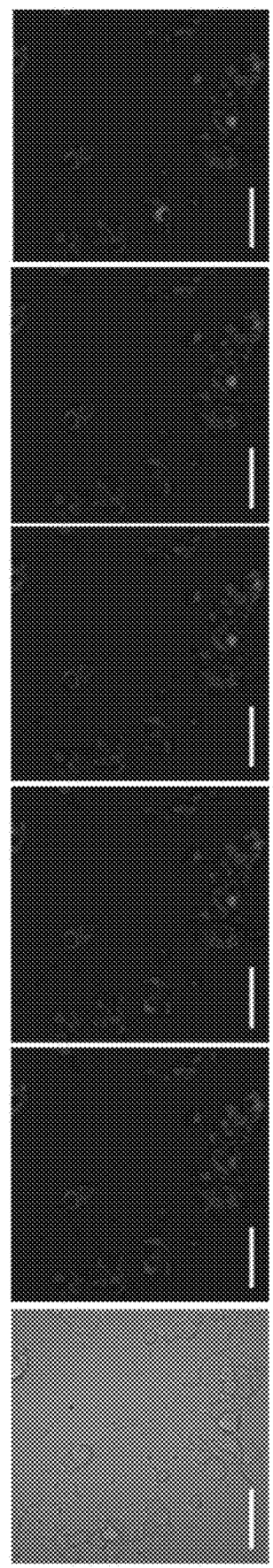

While both AuNS and AuNF showed excellent plasma membrane labeling, the larger absorbance cross-section of the AuNFs compared to AuNS enabled more efficient and controlled membrane depolarization when the membrane-tethered NPs were excited with long wavelength 640 nm light (FIGS. 10A-10D). PC-12 cells were labeled with AuNS—PEG-Chol or AuNF—PEG-Chol (1 nM concentration) and then excited with either 561 nm or 640 nm laser while recording membrane depolarization using the membrane potential sensing dye, DiSBAC$_2$(3). While both NP-Chol conjugates mediated comparable levels of membrane depolarization when excited with 561 nm laser, the significantly larger absorbance cross-section of the AuNF—PEG-Chol conjugates mediated a greater degree of membrane depolarization when excited with 640 nm laser. This is evidenced by the larger response of the membrane potential dye in AuNF—PEG-Chol-labeled cells excited with 640 nm laser (FIG. 10B) compared to cells labeled with same conjugates and excited with 561 nm laser (FIG. 10A).

FIGS. 11A-11H show results of comparative depolarization experiments where cells were labeled with AuNS—PEG-Chol or AuNF—PEG-Chol after the NPs were adjusted to either equal concentration (1 nM, FIG. 11A-D) or equal optical density (O.D.=0.52, FIG. 11E-H). Cells were photoexcited at either 561 nm or 640 at either of two laser power densities ($2.5\times10^4$ W/cm$^2$ or $6.3\times10^3$ W/cm$^2$). The data show that degree of plasma membrane depolarization tracks with increasing laser power density and that the AuNF—PEG-Chol conjugates mediate more efficient depolarization when excited at 640 nm compared to AuNS—PEG-Chol-labeled cells excited under the same conditions. Importantly, these trends were the same regardless of whether cells were labeled with NPs adjusted to the same concentration or to the same O.D.

Low Cytotoxicity

Figure 12B:
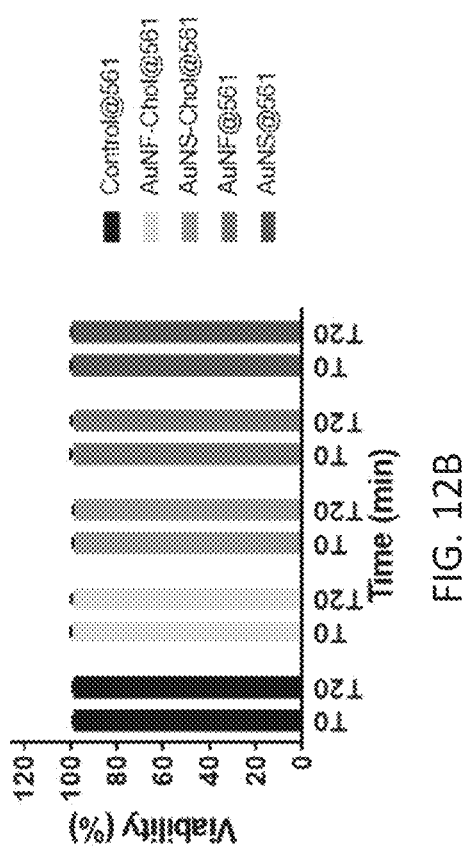
FIGS. 12A-12C show the effect of irradiated AuNS—PEG-Chol and AuNF—PEG-Chol on cellular viability.
Figure 12C:
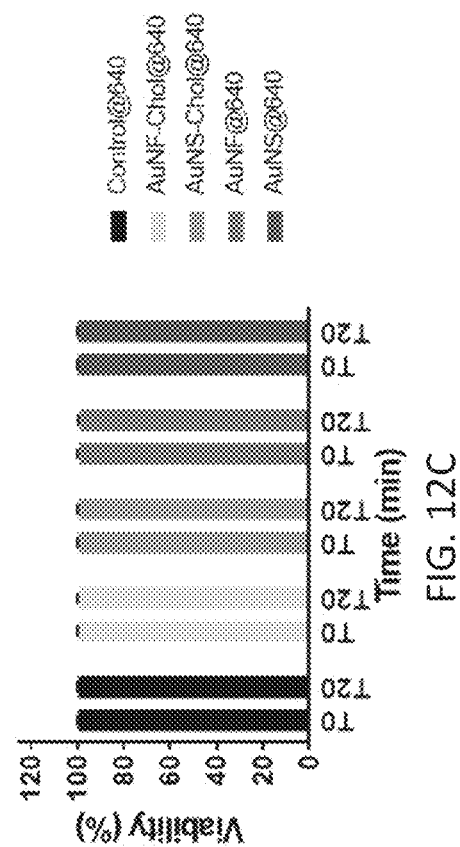
Figure 12A:
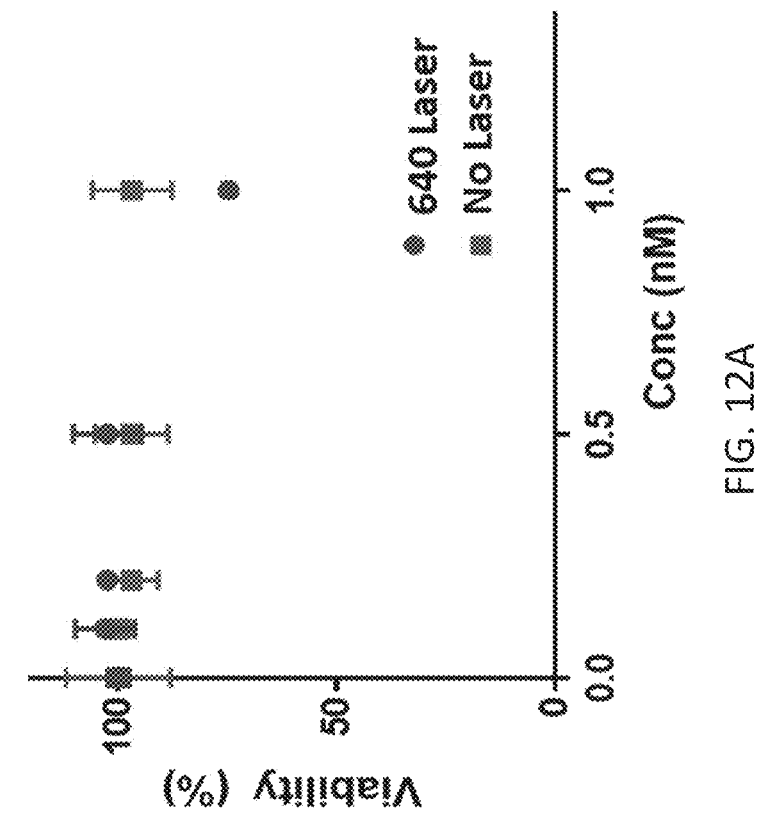

The effect of the AuNS—PEG-Chol and AuNF—PEG-Chol conjugates on cellular health and viability was assessed by various means in various cell lines. First, HeLa cells labeled with AuNF—PEG-Chol conjugates and excited with 640 nm laser ($6.1 \times 10^5$ W/cm² laser power density) showed no impact on cellular viability at concentrations up to 0.5 nM (FIG. 12A). In PC-1 cells labeled with AuNS—PEG-Chol or AuNF—PEG-Chol, photoexcitation of the cells at low laser power density ($2.5 \times 10^4$ W/cm²), conditions that emulated the membrane depolarization conditions, with 561 nm or 640 nm laser over a 20 min excitation period nm showed no impact on cellular viability. Data are provided in FIGS. 12A-12C.

Further Embodiments

Besides gold, other metals (example, Ag, Pt, Cu, or Pd) could be used in the synthesis to obtain similarly-shaped nanoflowers. The photothermal effect might be used in other applications besides the above-described cargo (e.g., drug or dye) delivery and membrane depolarization. Moreover, other types of molecular cargos (drugs, proteins, nucleic acids) could be delivery with same photothermal effect of gold nanoflower.

Advantages

Relative to the prior art, there are multiple advantages inherent in the invention described herein. First, this synthesis method for AuNFs eliminates the need for the generation of small seed AuNPs to grow the anisotropic AuNF nanoparticles. This is a significant improvement over previous synthesis methods as it is facile while still allowing for the control of AuNF nanoparticle growth. Furthermore, AuNF size can be discretely controlled (over the size regime of 20 nm to 500 nm) simply by controlling the reagent concentration as well as the species of capping ligand. By varying the functional terminal groups on the bidentate thiolate ligands used during the one-pot synthesis, different AuNF sizes and shapes can be realized in a predictable manner. This is nonobvious to one skilled in the art of nanoparticle synthesis. In addition, due to the strong interaction between the bidentate-terminated thiol ligands and gold precursors, the as-synthesized AuNFs exhibit high colloidal stability and functionality that enables further conjugation with various biomolecules. Moreover, two distinct cellular applications of the AuNFs exist for photoactivated/photothermal-induced control of cellular physiology: (1) delivery of membrane-impermeable drugs and (2) modulation of cellular membrane potential. Importantly, these examples display the inherent advantages of the AuNFs over AuNS in these applications.

The AuNF described herein exhibits high stability and functionality, making it suitable for further conjugation with various biomolecules due to the strong interaction between bidentate thiol and gold and various choice of terminal groups (—COOH, —NH₂, —PEGCOOH, PEG-NH₂, NTA).

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. Kolhatkar, A. G.; Chen, Y. T.; Chinwangso, P.; Nekrashevich, I.; Dannangoda, G. C.; Singh, A.; Jamison, A. C.; Zenasni, O.; Rusakova, I. A.; Martirosyan, K. S.; Litvinov, D.; Xu, S. J.; Willson, R. C.; Lee, T. R., Magnetic Sensing Potential of Fe3O4 Nanocubes Exceeds That of $Fe_3O_4$ Nanospheres. Acs Omega 2017, 2 (11), 8010-8019.
2. Kaittanis, C.; Santra, S.; Perez, J. M., Role of Nanoparticle Valency in the Nondestructive Magnetic-Relaxation-Mediated Detection and Magnetic Isolation of Cells in Complex Media. J Am Chem Soc 2009, 131 (35), 12780-12791.
3. Muroski, M. E.; Oh, E.; Nag, O. K.; Medintz, I. L.; Efros, A. L.; Huston, A.; Delehanty, J. B., Gold-Nanoparticle-Mediated Depolarization of Membrane Potential Is Dependent on Concentration and Tethering Distance from the Plasma Membrane. Bioconjugate Chem 2020, 31 (3), 567-576.
4. Mitchell, M. J.; Billingsley, M. M.; Haley, R. M.; Wechsler, M. E.; Peppas, N. A.; Langer, R., Engineering precision nanoparticles for drug delivery. Nat Rev Drug Discov 2021, 20 (2), 101-124.
5. Murphy, C. J.; Sau, T. K.; Gole, A. M.; Orendorff, C. J.; Gao, J.; Gou, L.; Hunyadi, S. E.; Li, T., Anisotropic metal nanoparticles: Synthesis, assembly, and optical applications. J Phys Chem B 2005, 109 (29), 13857-70.
6. Chandra, K.; Culver, K. S. B.; Werner, S. E.; Lee, R. C.; Odom, T. W., Manipulating the Anisotropic Structure of Gold Nanostars using Good's Buffers. Chem Mater 2016, 28 (18), 6763-6769.
7. Xie, J. P.; Lee, J. Y.; Wang, D. I. C., Seedless, surfactantless, high-yield synthesis of branched gold nanocrystals in HEPES buffer solution. Chem Mater 2007, 19 (11), 2823-2830.
8. Oh, E.; Delehanty, J. B.; Field, L. D.; Makinen, A. J.; Goswami, R.; Huston, A. L.; Medintz, I. L., Synthesis and Characterization of PEGylated Luminescent Gold Nanoclusters Doped with Silver and Other Metals. Chem Mater 2016, 28 (23), 8676-8688.
9. Oh, E.; Delehanty, J. B.; Sapsford, K. E.; Susumu, K.; Goswami, R.; Blanco-Canosa, J. B.; Dawson, P. E.; Granek, J.; Shoff, M.; Zhang, Q.; Goering, P. L.; Huston, A.; Medintz, I. L., Cellular Uptake and Fate of PEGylated Gold Nanoparticles Is Dependent on Both Cell-Penetration Peptides and Particle Size. Acs Nano 2011, 5 (8), 6434-6448.
10. Oh, E.; Susumu, K.; Goswami, R.; Mattoussi, H., One-Phase Synthesis of Water-Soluble Gold Nanoparticles with Control over Size and Surface Functionalities. Langmuir 2010, 26 (10), 7604-7613.
11. Oh, E.; Susumu, K.; Jain, V.; Kim, M.; Huston, A., One-pot aqueous phase growth of biocompatible 15-130 nm gold nanoparticles stabilized with bidentate PEG. J Colloid Interface Sci 2012, 376 (1), 107-11.
12. Mei, B. C.; Oh, E.; Susumu, K.; Farrell, D.; Mountziaris, T. J.; Mattoussi, H., Effects of Ligand Coordination Number and Surface Curvature on the Stability of Gold Nanoparticles in Aqueous Solutions. Langmuir 2009, 25 (18), 10604-10611.

13. Oh, E.; Susumu, K.; Makinen, A. J.; Deschamps, J. R.; Huston, A. L.; Medintz, I. L., Colloidal Stability of Gold Nanoparticles Coated with Multithiol-Poly(ethylene glycol) Ligands: Importance of Structural Constraints of the Sulfur Anchoring Groups. J Phys Chem C 2013, 117 (37), 18947-18956.
14. Nag, O. K.; Naciri, J.; Erickson, J. S.; Oh, E.; Delehanty, J. B., Hybrid Liquid Crystal Nanocarriers for Enhanced Zinc Phthalocyanine-Mediated Photodynamic Therapy. Bioconjugate chemistry 2018, 29 (8), 2701-2714.
15. Carvalho-de-Souza, J. L.; Nag, O. K.; Oh, E.; Huston, A. L.; Vurgaftman, I.; Pepperberg, D. R.; Bezanilla, E; Delehanty, J. B., Cholesterol Functionalization of Gold Nanoparticles Enhances Photoactivation of Neural Activity. ACS Chem. Neurosci. 2019, 10, 1478-1487.
16. Xiong et al., ACS Nano 2014, 8, 6, 6288-6296.

What is claimed is:

1. A method of synthesizing anisotropic gold nanoparticles, the method comprising:
   providing aurate ions, a ligand comprising thioctic acid, a reducing agent, and hydroxide and allowing them to react in an aqueous phase,
   thereby obtaining anisotropic gold nanoparticles having diameters in a range of 15-500 nm.

2. The method of claim 1, wherein the reducing agent is ascorbic acid.

3. The method of claim 1, wherein the ligand is selected from the group consisting of thioctic acid-$NH_2$ (TA-$NH_2$), TA-nitrilotriacetic acid (TA-NTA), TA-polyethylene glycol-COOH (TA-PEG-COOH), and TA-polyethylene glycol-$NH_2$ (TA-PEG-$NH_2$).

4. The method of claim 1, wherein, by controlling reaction conditions, one can obtain nanoparticles of greater or smaller size in said range of 15-500 nm in diameter.

5. A method of synthesizing anisotropic gold nanoparticles, the method comprising:
   providing aurate ions, a ligand comprising thioctic acid, ascorbic acid, and hydroxide and allowing them to react in an aqueous phase,
   thereby obtaining anisotropic gold nanoparticles having diameters in a range of 15-500 nm,
   wherein the ligand is selected from the group consisting of thioctic acid-$NH_2$ (TA-$NH_2$), TA-nitrilotriacetic acid (TA-NTA), TA-polyethylene glycol-COOH (TA-PEG-COOH), and TA-polyethylene glycol-$NH_2$ (TA-PEG-$NH_2$).

* * * * *